United States Patent
Won

(10) Patent No.: US 12,082,271 B2
(45) Date of Patent: Sep. 3, 2024

(54) METHOD AND APPARATUS FOR PROVIDING AN ALWAYS-ON ATTRIBUTE OF A PDU SESSION AND FOR PROVIDING INTERWORKING ASPECTS WITH RESPECT TO AN ALWAYS-ON PDU SESSION

(71) Applicant: NOKIA TECHNOLOGIES OY, Espoo (FI)

(72) Inventor: Sung Hwan Won, Seoul (KR)

(73) Assignee: NOKIA TECHNOLOGIES OY, Espoo (FI)

(*) Notice: Subject to any disclaimer, the term of this patent is extended or adjusted under 35 U.S.C. 154(b) by 0 days.

(21) Appl. No.: 18/115,710

(22) Filed: Feb. 28, 2023

(65) Prior Publication Data

US 2023/0284295 A1    Sep. 7, 2023

Related U.S. Application Data

(62) Division of application No. 17/266,210, filed as application No. PCT/US2019/045575 on Aug. 7, 2019, now Pat. No. 11,622,393.

(Continued)

(51) Int. Cl.
*H04W 76/10* (2018.01)
*H04W 80/10* (2009.01)

(52) U.S. Cl.
CPC .......... *H04W 76/10* (2018.02); *H04W 80/10* (2013.01)

(58) Field of Classification Search
CPC . H04W 76/10; H04W 80/10; H04W 36/0022; H04W 36/14; H04W 76/20
See application file for complete search history.

(56) References Cited

U.S. PATENT DOCUMENTS

| 2007/0155376 A1* | 7/2007 | Payyappilly .......... H04W 76/22 709/217 |
| 2009/0252132 A1* | 10/2009 | Song .................. H04W 76/15 455/450 |

(Continued)

FOREIGN PATENT DOCUMENTS

| CN | 104902586 A | 9/2015 |
| CN | 106134255 A | 11/2016 |

(Continued)

OTHER PUBLICATIONS

"(Draft) Reply LS on SR in 5G", 3GPP Draft; SA WG2 Meeting #127bis, S2-185028, (May 28-Jun. 1, 2018), 1 page.

(Continued)

*Primary Examiner* — Ankur Jain
(74) *Attorney, Agent, or Firm* — ALSTON & BIRD LLP

(57) ABSTRACT

A method, apparatus and computer program product may be provided for providing always-on as an attribute of a PDU session, providing interworking aspects with respect to an always-on PDU session, and enabling network determination of whether a PDU session will be an always-on PDU session. An example method may include receiving, from UE, a PDU session establishment request message, the PDU session establishment request message comprising an always-on PDU session requested IE set to a value indicative of a request to establish a new-always on PDU session (e.g., "Always-on PDU session requested"), and upon a determination that the requested PDU session shall be established as an always-on PDU session, cause transmission of a PDU session establishment accept message, the PDU session establishment accept message comprising an always-on PDU session indication IE that is set to a value indicative of always-on PDU session required ("Always-on PDU session required").

24 Claims, 9 Drawing Sheets

Related U.S. Application Data

(60) Provisional application No. 62/715,330, filed on Aug. 7, 2018.

(56) References Cited

U.S. PATENT DOCUMENTS

| | | | | |
|---|---|---|---|---|
| 2015/0215822 | A1* | 7/2015 | Won | H04W 36/0011 370/331 |
| 2017/0111404 | A1* | 4/2017 | Noldus | H04L 65/1104 |
| 2018/0199398 | A1* | 7/2018 | Dao | H04W 76/34 |
| 2018/0227873 | A1* | 8/2018 | Vrzic | H04W 60/04 |
| 2019/0069327 | A1* | 2/2019 | Kim | H04W 4/24 |
| 2019/0312821 | A1* | 10/2019 | Huang-Fu | H04W 28/0268 |
| 2020/0137675 | A1* | 4/2020 | Park | H04W 68/005 |
| 2021/0022099 | A1* | 1/2021 | Kumar | H04W 8/08 |
| 2021/0076444 | A1* | 3/2021 | Shu | H04W 48/16 |

FOREIGN PATENT DOCUMENTS

| | | |
|---|---|---|
| EP | 3756414 A1 | 12/2020 |
| EP | 3834584 A2 | 6/2021 |
| RU | 2645592 C1 | 2/2018 |
| WO | WO 2017/142170 A1 | 8/2017 |
| WO | WO 2017/142171 A1 | 8/2017 |
| WO | WO 2018/127190 A1 | 7/2018 |
| WO | WO 2019/182430 A1 | 9/2019 |
| WO | WO 2020/033596 A3 | 3/2020 |

OTHER PUBLICATIONS

"3rd Generation Partnership Project; 5G; Non-Access Stratum (NAS) Protocol for 5G System (5GS); Stage 3 (Release 15)", 3GPP TS 24.501 15.6.0, (Dec. 2019), 478 pages.
"3rd Generation Partnership Project; Technical Specification Group Core Network and Terminals; Non-Access-Stratum (NAS) protocol for 5G System (5GS); Stage 3 (Release 15)", 3GPP TS 24.501 v15.0.0 (Jun. 2018), 338 pages.
Chandramouli et al., "5G for the Connected World", First Edition, John Wiley & Sons, Inc., Chapter 6 (2019), 26 pages.
Decision to Grant for Russian Application No. 2021105639/07 dated Dec. 8, 2021, 15 pages.
Ericsson et al., "5G QoS—Restructuring QoS Rules IE", 3GPP Draft, 3GPP TSG-CT WG1 Meeting #111, C1-183855, (May 21-25, 2018), 27 pages.
First Examination Report for Indian Application No. 202127009097 dated Aug. 18, 2022, 8 pages.
Huawei et al., "Network Control for Always-On PDU Sessions", 3GPP TSG-CT WG1 Meeting #111bis, C1-184619, (Jul. 9-13, 2018), 9 pages.
Huawei et al., "Handling of EPS Bearer Context and PDU Session Context for Interworking Without N26", 3GPP Draft, 3GPP TSG-CT WG1 Meeting #109, C1-181708, (Feb. 26-Mar. 2, 2018), 5 pages.
Huawei et al., "Network Control for Always-On PDU Sessions", 3GPP TSG-CT WG1 Meeting #111bis, C1-184858, (Jul. 9-13, 2018), 9 pages.
International Preliminary Report on Patentability, Chapter II of the Patent Cooperation Treaty for Patent Cooperation Treaty Application No. PCT/US2019/045575 dated Aug. 7, 2018, 34 pages.
International Search Report and Written Opinion for Patent Cooperation Treaty Application No. PCT/US2019/045575 dated Feb. 17, 2020, 23 pages.
Nokia et al., "A New PDU Session Attribute "Always-On" and Interworking With Eps", 3GPP TSG-CT WG1 Meeting #112, C1-185xxx, (Aug. 20-24, 2018), 28 pages.
Notice of Acceptance for Australian Application No. 2019317586 dated Aug. 2, 2022, 3 pages.
Notice of Allowance for U.S. Appl. No. 17/266,210 dated Nov. 30, 2022.
Office Action for Algerian Application No. DZ/P/2021/000092 dated Feb. 2, 2022, 2 pages.
Office Action for ARIPO Application No. AP/P/2021/012960 dated Oct. 26, 2022, 6 pages.
Office Action for Australian Application No. 2019317586 dated Sep. 29, 2021, 4 pages.
Office Action for Chilean Application No. 202100320 dated Mar. 5, 2022, 13 pages.
Office Action for European Application No. 19759462.5 dated Apr. 13, 2022, 6 pages.
Office Action for Japanese Application No. 2021-506316 dated May 9, 2022, 3 pages.
Office Action for Korean Application No. 10-2021-7006405 dated Aug. 3, 2022, 9 pages.
Office Action for Russian Application No. 2021105639/07 dated Sep. 16, 2021, 7 pages.
Office Action for Vietnamese Application No. 1-2021-01181 dated Mar. 11, 2022, 4 pages.
Search Report and Written Opinion for Singapore Application No. 11202101135T dated Sep. 5, 2022, 12 pages.
Decision to Grant for Japanese Application No. 2021-506316 dated Sep. 4, 2023, 4 pages.
Decision to Grant for Vietnamese Application No. 1-2021-01181 dated Aug. 25, 2022, 2 pages.
Notice of Acceptance for Chilean Application No. 2021-000320 dated Apr. 4, 2023, 6 pages.
Notice of Acceptance for Singapore Application No. 11202101135T dated Jun. 6, 2023, 6 pages.
Notice of Allowance for Korean Application No. 10-2021-7006405 dated Feb. 22, 2023, 6 pages.
Office Action for Chilean Application No. 202100320 dated Sep. 28, 2022, 20 pages.
Office Action for Egyptian Application No. 192/2021 dated Mar. 30, 2023, 8 pages.
Office Action for Indonesian Application No. P00202101621 dated Jun. 13, 2023, 6 pages.
Office Action for Japanese Application No. 2021-506316 dated Mar. 1, 2023, 3 pages.
Office Action for Saudi Arabian Application No. 521421186 dated Sep. 4, 2023, 9 pages.
Office Action for Thailand Application No. 2101000646 dated Jul. 17, 2023, 6 pages.
Decision to Grant for European Application No. 19759462.5 dated Aug. 10, 2023, 2 pages.
Extended European Search Report for European Application No. 23187745.7 dated Oct. 6, 2023, 13 pages.
Huawei et al., "Discussion on Network Control for Always-On PDU Sessions", 3GPP TSG CT WG1 Meeting #111bis, C1-184544, (Jul. 9-13, 2018), 4 pages.
Huawei et al., "Network Control for Always-On PDU Sessions", 3GPP TSG-CT WG1 Meeting #111bis, Change Request CR 0107, C1-184316, (Jul. 9-13, 2018), 9 pages.
Huawei et al., "Network Control for Always-On PDU Sessions", 3GPP TSG-CT WG1 Meeting #111bis, Change Request CR 0107, C1-184545, (Jul. 9-13, 2018), 9 pages.
Huawei et al., "Network Control for Always-On PDU Sessions", 3GPP TSG-CT WG1 Meeting #112, Change Request CR 0107, C1-185794, (Aug. 20-24, 2018), 27 pages.
MediaTek Inc., "Extend +CGDCONT for Always-On PDU Session", 3GPP TSG-CT WG1 Meeting #111bis, Change Request CR 0593, C1-184489, (Jul. 9-13, 2018), 7 pages.
Nokia et al., "A New PDU Session Attribute "Always-On" and Interworking with EPS", 3GPP TSG-CT WG1 Meeting #112, C1-185284, (Aug. 20-24, 2018), 28 pages.
Nokia et al., "A New Pdu Session Attribute "Always-On", and Interworking with EPS", 3GPP TSG-CT WG1 Meeting #112, Change Request CR 0309, C1-185624, (Aug. 20-24, 2018), 22 pages.
Notice of Allowance for Canadian Application No. 3,108,760 dated Nov. 10, 2023, 1 page.
Office Action for Australian Application No. 2022268352 dated Oct. 30, 2023, 8 pages.
Office Action for Chinese Application No. 201980057659.1 dated Dec. 23, 2023, 20 pages.

(56) References Cited

OTHER PUBLICATIONS

Office Action for Colombia Application No. NC2021/0002943 dated Nov. 22, 2023, 24 pages.
Office Action for Egyptian Application No. 192/2021 dated Jan. 21, 2024, 6 pages.
Office Action for Korean Application No. 10-2023-7017356 dated Jan. 23, 2024, 6 pages.
Qualcomm Incorporated, "Including S-NSSAI Received in EPS in Requested NSSAI and in PDU Session Establishment Request Upon inter-System Change from S1 Mode to N1 Mode", 3GPP TSG-CT WG1 Meeting #111bis, Change Request CR 0082, C1-184634, (Jul. 9-13, 2018), 7 pages.
Samsung, "Discussion on Network Control of Always-On PDU Session", SA WG2 Meeting #127bis, S2-185030, (May 28-Jun. 1, 2018), 2 pages.
U.S. Appl. No. 17/266,210, filed Feb. 5, 2021, U.S. Pat. No. 11,622,393, Patented.
Office Action for Colombian Application No. NC2021/0002943 dated Mar. 1, 2024, 20 pages.
Office Action for Saudi Arabian Application No. 521421186 dated Mar. 5, 2024, 7 pages.

\* cited by examiner

400

800

METHOD AND APPARATUS FOR PROVIDING AN ALWAYS-ON ATTRIBUTE OF A PDU SESSION AND FOR PROVIDING INTERWORKING ASPECTS WITH RESPECT TO AN ALWAYS-ON PDU SESSION

CROSS-REFERENCE TO RELATED APPLICATIONS

The present application is a divisional of U.S. Non-Provisional patent application Ser. No. 17/266,210, filed Feb. 5, 2021 and entitled "Method and Apparatus for Providing an Always-on Attribute of a PDU Session and for Providing Interworking Aspects with Respect to an Always-on PDU Session, which is a National Stage Entry of International Patent Application No. PCT/US2019/045575, filed Aug. 7, 2019 and entitled "Method and Apparatus for Providing an Always-on Attribute of a PDU Session and for Providing Interworking Aspects with Respect to an Always-on PDU Session," which claims priority under 35 U.S.C. § 119 to U.S. Provisional Application No. 62/715,330, filed Aug. 7, 2018 and entitled "Method and Apparatus for Providing an Always-on Attribute of a PDU Session and for Providing Interworking Aspects with Respect to an Always-on PDU Session, the entire disclosures of each of which are hereby incorporated expressly herein by reference in their entireties for all purposes.

TECHNICAL FIELD

An example embodiment relates generally to a method and apparatus for providing an always-on as an attribute of a Protocol Data Unit (PDU) session and for providing interworking aspects with respect to an always-on PDU session and, more particularly, for providing functionality enabling the determination of whether a PDU session can be an always-on PDU session or not to be decided by the network.

BACKGROUND

In 5$^{th}$ generation wireless systems (5G), user equipment (UE) cannot initiate a service request procedure while another service request procedure is ongoing. That is, a new service request procedure can be started only if the old service request procedure is completed. This restriction may cause some delay in services using a PDU session which is requested to be reactivated in the new service request procedure.

Since such delay can be problematic to delay-sensitive services, the "always-on PDU session" has been introduced. The always-on PDU session is a PDU session for which user-plane resources have to be activated during transition from 5GMM-IDLE mode to 5GMM-CONNECTED mode. Such a PDU session may be established based on indication from upper layers. However, current specification (i.e., 3GPP TS 24.501) does not provide any indication with regard to how the upper layers in the UE may be configured to provide an indication.

As such, the network control is missing from the always-on PDU session. In particular, the network does not know if a PDU session is an always-on PDU session or not and the network cannot set a PDU session to an always-on PDU session or non-always-on PDU session. Because an always-on PDU session may consume more network resources than a non-always-on PDU session, a solution in which network control of an always-on PDU session is introduced in the present application.

BRIEF SUMMARY

In the current specification, the "always-on" property is not considered as an attribute of a PDU session. Examples of existing PDU session attributes are: SSC mode, PDU session type, DNN, S-NSSAI. The commonality should be maximized among these attributes. More specifically, the UE should be able to indicate to the network whether it requests a PDU session to be always-on or not via the PDU session establishment request message because the number of user's subscription check for deciding the always-on property can be minimized. That is, if the always-on property is not requested and the DNN is internet, an SMF can be configured to decide the PDU session to be non-always-on PDU session without checking user's subscription. However, it should not be misunderstood that the network can decide a PDU session to be always-on. The always-on determination may be made only if the UE has requested so. However, whether a PDU session can be an always-on PDU session or not, is decided by the network. Because an always-on PDU session is likely to require session continuity during an inter-system change, interworking aspects need to be specified. The current specification lacks those interworking aspects.

A method, apparatus and computer program product are provided in accordance with an example embodiment in order to provide and/or utilize an always-on as an attribute of a Protocol Data Unit (PDU) session and to provide interworking aspects with respect to an always-on PDU session. Moreover, a method, apparatus and computer program product are provided for providing functionality enabling the determination of whether a PDU session can be an always-on PDU session or not to be decided by the network.

In some embodiments, a method for performing a service request procedure may be provided, the method comprising: receiving, from user equipment (UE), a protocol data unit (PDU) session establishment request message, the PDU session establishment request message configured to indicate a request to establish a new PDU session, the PDU session establishment request message comprise an always-on PDU session requested information element (IE), the always-on PDU session requested IE set to a value indicative of a request to establish a new-always on PDU session or the PDU session establishment request message does not comprise the always-on PDU session requested IE; and determining, based on local policies or configurations and in an instance in which the always-on PDU session requested IE is available, the always-on PDU session requested IE, whether the requested PDU session shall be established as an always-on PDU session.

In some embodiments, the method may further comprise: upon a determination that the requested PDU session shall be established as an always-on PDU session, causing transmission of a PDU session establishment accept message, the PDU session establishment accept message comprising an always-on PDU session indication IE, wherein the always-on PDU session indication IE is set to a value indicative of "Always-on PDU session required".

In some embodiments, the method may further comprise: upon a determination that the requested PDU session shall not be established as an always-on PDU session, causing transmission of a PDU session establishment accept message, the PDU session establishment accept message comprising: an always-on PDU session indication IE, wherein the always-on PDU session indication IE is set to a value indicative of "Always-on PDU session not allowed", if the UE included the always-on PDU session requested IE in the PDU session establishment request message; or no always-on PDU session indication IE, if the UE did not include the always-on PDU session requested IE in the PDU session establishment request message.

In some embodiments, in an instance in which the always-on PDU session indication IE is included in the PDU session establishment accept message, and the always-on PDU session indication IE is set to a value indicative of "Always-on PDU session required", the method further comprises: causing the UE to consider the established PDU session as an always-on PDU session.

In some embodiments, in an instance in which: the always-on PDU session indication IE is not included in the PDU session establishment accept message, or the always-on PDU session indication IE is included in the PDU session establishment accept message, and the always-on PDU session indication IE is set to a value indicative of "Always-on PDU session not allowed", the method further comprises: causing the UE to not consider the established PDU session as an always-on PDU session.

In some embodiments, the method may further comprise: upon an inter-system change from N1 mode to S1 mode, maintaining, at the UE and the SMF, the always-on PDU session indication.

In some embodiments, the method may further comprise: upon an inter-system change from S1 mode to N1 mode, determining, based on the always-on PDU session indication, whether the PDU session transferred from Evolved Packed System (EPS) is an always-on PDU session.

In some embodiments, an apparatus for performing a service request procedure may be provided, the apparatus comprising at least one processor and at least one memory including computer program code, the at least one memory and the computer program code configured to, with the processor, cause the apparatus to at least: receive, from user equipment (UE), a protocol data unit (PDU) session establishment request message, the PDU session establishment request message configured to indicate a request to establish a new PDU session, the PDU session establishment request message comprising an always-on PDU session requested information element (IE), the always-on PDU session requested IE set to a value indicative of a request to establish a new-always on PDU session or the PDU session establishment request message does not comprise the always-on PDU session requested IE; and determine, based on local policies or configurations and in an instance in which the always-on PDU session requested IE is available, the always-on PDU session requested IE, whether the requested PDU session shall be established as an always-on PDU session.

In some embodiments, the at least one memory and the computer program code are further configured to, with the processor, cause the apparatus to: upon a determination that the requested PDU session shall be established as an always-on PDU session, cause transmission of a PDU session establishment accept message, the PDU session establishment accept message comprising an always-on PDU session indication IE, wherein the always-on PDU session indication IE is set to a value indicative of "Always-on PDU session required".

In some embodiments, the at least one memory and the computer program code are further configured to, with the processor, cause the apparatus to: upon a determination that the requested PDU session shall not be established as an always-on PDU session, cause transmission of a PDU session establishment accept message, the PDU session establishment accept message comprising an always-on PDU session indication IE, wherein the always-on PDU session indication IE is set to a value indicative of "Always-on PDU session not allowed", if the UE included the always-on PDU session requested IE in the PDU session establishment request message; or no always-on PDU session indication IE, if the UE did not include the always-on PDU session requested IE in the PDU session establishment request message.

In some embodiments, wherein in an instance in which the always-on PDU session indication IE is included in the PDU session establishment accept message, and the always-on PDU session indication IE is set to a value indicative of "Always-on PDU session required", wherein the at least one memory and the computer program code are further configured to, with the processor, cause the apparatus to: cause the UE to consider the established PDU session as an always-on PDU session.

In some embodiments, wherein in an instance in which: the always-on PDU session indication IE is not included in the PDU session establishment accept message, or the always-on PDU session indication IE is included in the PDU session establishment accept message, and the always-on PDU session indication IE is set to a value indicative of "Always-on PDU session not allowed", wherein the at least one memory and the computer program code are further configured to, with the processor, cause the apparatus to: cause the UE to not consider the established PDU session as an always-on PDU session.

In some embodiments, the at least one memory and the computer program code are further configured to, with the processor, cause the apparatus to: upon an inter-system change from N1 mode to S1 mode, maintain, at the UE and the SMF, the always-on PDU session indication.

In some embodiments, the at least one memory and the computer program code are further configured to, with the processor, cause the apparatus to: upon an inter-system change from S1 mode to N1 mode, determine, based on the always-on PDU session indication, whether the PDU session transferred from Evolved Packed System (EPS) is an always-on PDU session.

In some embodiments, a computer program product for performing a service request procedure may be provided, the computer program product comprising at least one non-transitory computer-readable storage medium having computer-executable program code instructions stored therein, the computer-executable program code instructions comprising program code instructions for: receiving, from user equipment (UE), a protocol data unit (PDU) session establishment request message, the PDU session establishment request message configured to indicate a request to establish a new PDU session, the PDU session establishment request message comprising an always-on PDU session requested information element (IE), the always-on PDU session requested IE set to a value indicative of a request to establish a new-always on PDU session or the PDU session establishment request message does not comprise the always-on PDU session requested IE; and determining, based on local policies or configurations, and in an instance in which the always-on PDU session requested IE is available, the always-on PDU session requested IE whether the requested PDU session shall be established as an always-on PDU session.

In some embodiments, the computer-executable program code instructions further comprise program code instructions for: upon a determination that the requested PDU session shall be established as an always-on PDU session, causing transmission of a PDU session establishment accept message, the PDU session establishment accept message comprising an always-on PDU session indication IE, wherein the always-on PDU session indication IE is set to a value indicative of "Always-on PDU session required".

In some embodiments, the computer-executable program code instructions further comprise program code instructions for: upon a determination that the requested PDU session shall not be established as an always-on PDU session, causing transmission of a PDU session establishment accept message, the PDU session establishment accept message comprising an always-on PDU session indication IE, wherein the always-on PDU session indication IE is set to a value indicative of "Always-on PDU session not allowed", if the UE included the always-on PDU session requested IE in the PDU session establishment request message; or no always-on PDU session indication IE, if the UE did not include the always-on PDU session requested IE in the PDU session establishment request message.

In some embodiments, wherein in an instance in which the always-on PDU session indication IE is included in the PDU session establishment accept message, and the always-on PDU session indication IE is set to a value indicative of "Always-on PDU session required", wherein the computer-executable program code instructions further comprise program code instructions for: causing the UE to consider the established PDU session as an always-on PDU session.

In some embodiments, in an instance in which: the always-on PDU session indication IE is not included in the PDU session establishment accept message, or the always-on PDU session indication IE is included in the PDU session establishment accept message, and the always-on PDU session indication IE is set to a value indicative of "Always-on PDU session not allowed", wherein the computer-executable program code instructions further comprise program code instructions for: causing the UE to not consider the established PDU session as an always-on PDU session.

In some embodiments, the computer-executable program code instructions further comprise program code instructions for: upon an inter-system change from N1 mode to S1 mode, maintaining, at the UE and the SMF, the always-on PDU session indication.

In some embodiments, the computer-executable program code instructions further comprise program code instructions for: upon an inter-system change from S1 mode to N1 mode, determining, based on the always-on PDU session indication, whether the PDU session transferred from Evolved Packed System (EPS) is an always-on PDU session.

In some embodiments, an apparatus for performing a service request procedure may be provided, the apparatus comprising: means for receiving, from user equipment (UE), a protocol data unit (PDU) session establishment request message, the PDU session establishment request message configured to indicate a request to establish a new PDU session, the PDU session establishment request message comprising an always-on PDU session requested information element (IE), the always-on PDU session requested IE set to a value indicative of a request to establish a new-always on PDU session or the PDU session establishment request message does not comprise the always-on PDU session requested IE; and means for determining, based on local policies or configurations, and in an instance in which the always-on PDU session requested IE is available, the always-on PDU session requested IE, whether the requested PDU session shall be established as an always-on PDU session.

In some embodiments, the apparatus may further comprise means for causing transmission, upon a determination that the requested PDU session shall be established as an always-on PDU session, of a PDU session establishment accept message, the PDU session establishment accept message comprising an always-on PDU session indication IE, wherein the always-on PDU session indication IE is set to a value indicative of "Always-on PDU session required".

In some embodiments, the apparatus may further comprise means for causing transmission, upon a determination that the requested PDU session shall not be established as an always-on PDU session, of a PDU session establishment accept message, the PDU session establishment accept message comprising an always-on PDU session indication IE, wherein the always-on PDU session indication IE is set to a value indicative of "Always-on PDU session not allowed", if the UE included the always-on PDU session requested IE in the PDU session establishment request message; or no always-on PDU session indication IE, if the UE did not include the always-on PDU session requested IE in the PDU session establishment request message.

In some embodiments, wherein in an instance in which the always-on PDU session indication IE is included in the PDU session establishment accept message, and the always-on PDU session indication IE is set to a value indicative of "Always-on PDU session required", the apparatus further comprising: means for causing the UE to consider the established PDU session as an always-on PDU session.

In some embodiments, wherein in an instance in which: the always-on PDU session indication IE is not included in the PDU session establishment accept message, or the always-on PDU session indication IE is included in the PDU session establishment accept message, and the always-on PDU session indication IE is set to a value indicative of "Always-on PDU session not allowed", the apparatus further comprising: means for causing the UE to not consider the established PDU session as an always-on PDU session.

In some embodiments, the apparatus may further comprise means for maintaining, upon an inter-system change from N1 mode to S1 mode, at the UE and the SMF, the always-on PDU session indication.

In some embodiments, the apparatus may further comprise means for determining, upon an inter-system change from S1 mode to N1 mode, based on the always-on PDU session indication, whether the PDU session transferred from Evolved Packed System (EPS) is an always-on PDU session.

In some embodiments a method may be provided comprising causing transmission of a protocol data unit (PDU) session establishment request message, the PDU session establishment request message configured to indicate a request to establish a new PDU session, wherein the PDU session establishment request message comprises: an always-on PDU session requested information element (IE) set to a value indicative of a request to establish a new-always on protocol data unit (PDU) session or the PDU session establishment request message does not comprise the always-on PDU session requested IE; upon a determination that the requested PDU session shall be established as an always-on PDU session, receiving a PDU session establishment accept message, the PDU session establishment accept message comprising an always-on PDU session indication IE, wherein the always-on PDU session indication IE is set to a value indicative of "Always-on PDU session required"; and upon a determination that the requested PDU session shall not be established as an always-on PDU session, receiving the PDU session establishment accept message, wherein the PDU session establishment accept message comprises: an always-on PDU session indication IE, wherein the always-on PDU session indication IE is set to a value indicative of "Always-on PDU session not allowed", if the UE included the always-on PDU session requested IE in the PDU session establishment request message; or no always-on PDU session indication IE, if the UE did not include the always-on PDU session requested IE in the PDU session establishment request message.

In some embodiments, the method may further comprise, in an instance in which the always-on PDU session indication IE is included in the PDU session establishment accept message, and the always-on PDU session indication IE is set to a value indicative of "Always-on PDU session required", considering the established PDU session as an always-on PDU session.

In some embodiments, the method may further comprise: in an instance in which the always-on PDU session indication IE is included in the PDU session establishment accept message, and the always-on PDU session indication IE is set to a value indicative of "Always-on PDU session not allowed", not considering the established PDU session as an always-on PDU session.

In some embodiments, an apparatus may be provided comprising at least one processor and at least one memory including computer program code, the at least one memory and the computer program code configured to, with the processor, cause the apparatus to at least: cause transmission of a protocol data unit (PDU) session establishment request message, the PDU session establishment request message configured to indicate a request to establish a new PDU session, wherein the PDU session establishment request message comprises: an always-on PDU session requested information element (IE) set to a value indicative of a request to establish a new-always on protocol data unit (PDU) session or the PDU session establishment request message does not comprise the always-on PDU session requested IE; upon a determination that the requested PDU session shall be established as an always-on PDU session, receive a PDU session establishment accept message, the PDU session establishment accept message comprising an always-on PDU session indication IE, wherein the always-on PDU session indication IE is set to a value indicative of "Always-on PDU session required"; and upon a determination that the requested PDU session shall not be established as an always-on PDU session, receive the PDU session establishment accept message, wherein the PDU session establishment accept message comprises: an always-on PDU session indication IE, wherein the always-on PDU session indication IE is set to a value indicative of "Always-on PDU session not allowed"", if the UE included the always-on PDU session requested IE in the PDU session establishment request message; or no always-on PDU session indication IE, if the UE did not include the always-on PDU session requested IE in the PDU session establishment request message.

In some embodiments the at least one memory and the computer program code are further configured to, with the processor, cause the apparatus to: in an instance in which the always-on PDU session indication IE is included in the PDU session establishment accept message, and the always-on PDU session indication IE is set to a value indicative of "Always-on PDU session required", consider the established PDU session as an always-on PDU session.

In some embodiments the at least one memory and the computer program code are further configured to, with the processor, cause the apparatus to: in an instance in which the always-on PDU session indication IE is included in the PDU session establishment accept message, and the always-on PDU session indication IE is set to a value indicative of "Always-on PDU session not allowed", not consider the established PDU session as an always-on PDU session.

In some embodiments, a computer program product may be provided comprising at least one non-transitory computer-readable storage medium having computer-executable program code instructions stored therein, the computer-executable program code instructions comprising program code instructions for: causing transmission of a protocol data unit (PDU) session establishment request message, the PDU session establishment request message configured to indicate a request to establish a new PDU session, wherein the PDU session establishment request message comprises: an always-on PDU session requested information element (IE) set to a value indicative of a request to establish a new-always on protocol data unit (PDU) session or the PDU session establishment request message does not comprise the always-on PDU session requested IE; upon a determination that the requested PDU session shall be established as an always-on PDU session, receiving a PDU session establishment accept message, the PDU session establishment accept message comprising an always-on PDU session indication IE, wherein the always-on PDU session indication IE is set to a value indicative of "Always-on PDU session required"; and upon a determination that the requested PDU session shall not be established as an always-on PDU session, receiving the PDU session establishment accept message, wherein the PDU session establishment accept message comprises: an always-on PDU session indication IE, wherein the always-on PDU session indication IE is set to a value indicative of "Always-on PDU session not allowed"", if the UE included the always-on PDU session requested IE in the PDU session establishment request message; or no always-on PDU session indication IE, if the UE did not include the always-on PDU session requested IE in the PDU session establishment request message.

In some embodiments, the computer-executable program code instructions further comprise program code instructions for: in an instance in which the always-on PDU session indication IE is included in the PDU session establishment accept message, and the always-on PDU session indication IE is set to a value indicative of "Always-on PDU session required", considering the established PDU session as an always-on PDU session.

In some embodiments, wherein the computer-executable program code instructions further comprise program code instructions for: in an instance in which the always-on PDU session indication IE is included in the PDU session establishment accept message, and the always-on PDU session indication IE is set to a value indicative of "Always-on PDU session not allowed", not considering the established PDU session as an always-on PDU session.

In some embodiments, an apparatus may be provided comprising: means for causing transmission of a protocol data unit (PDU) session establishment request message, the PDU session establishment request message configured to indicate a request to establish a new PDU session, wherein the PDU session establishment request message comprises: an always-on PDU session requested information element (IE) set to a value indicative of a request to establish a new-always on protocol data unit (PDU) session or the PDU session establishment request message does not comprise the always-on PDU session requested IE; upon a determination that the requested PDU session shall be established as an always-on PDU session, means for receiving a PDU session establishment accept message, the PDU session establishment accept message comprising an always-on PDU session indication IE, wherein the always-on PDU session indication IE is set to a value indicative of "Always-on PDU session required"; and upon a determination that the requested PDU session shall not be established as an always-on PDU session, means for receiving the PDU session establishment accept message, wherein the PDU session establishment accept message comprises: an always-on PDU session indication IE, wherein the always-on PDU session indication IE is set to a value indicative of "Always-on PDU session not allowed", if the UE included the always-on PDU session requested IE in the PDU session establishment request message; or no always-on PDU session indication IE, if the UE did not include the always-on PDU session requested IE in the PDU session establishment request message.

In some embodiments, the apparatus may further comprise, in an instance in which the always-on PDU session indication IE is included in the PDU session establishment accept message, and the always-on PDU session indication IE is set to a value indicative of "Always-on PDU session required", means for considering the established PDU session as an always-on PDU session.

In some embodiments, the apparatus may further comprise, in an instance in which the always-on PDU session indication IE is included in the PDU session establishment accept message, and the always-on PDU session indication IE is set to a value indicative of "Always-on PDU session not allowed", means for not considering the established PDU session as an always-on PDU session.

In some embodiments, a method may be provided, comprising receiving, from user equipment (UE), a protocol data unit (PDU) session modification request message, the PDU session modification request message configured to indicate a request to modify a PDU session corresponding to a PDN connection established when in S1 mode, after the first inter-system change from S1 mode to N1 mode, the PDU session modification request message comprising an information element (IE) set to a value indicative of a request the PDU session to be an always-on protocol data unit (PDU) session; and determining, based on local policies or configurations, whether the requested PDU session shall be an always-on PDU session.

In some embodiments, upon a determination that the requested PDU session shall be an always-on PDU session, the method further comprising: causing transmission of a PDU session modification command message, the PDU session modification command message comprising an always-on PDU session indication IE, wherein the always-on PDU session indication IE is set to a value indicative of "Always-on PDU session required".

In some embodiments, upon a determination that the requested PDU session shall not be an always-on PDU session, further comprising: causing transmission of a PDU session modification command message, the PDU session modification command message comprising an always-on PDU session indication IE, wherein the always-on PDU session indication IE is set to a value indicative of "Always-on PDU session not allowed".

In some embodiments, wherein in an instance in which the always-on PDU session indication IE is included in the PDU session modification command message, and the always-on PDU session indication IE is set to a value indicative of "Always-on PDU session required", the method further comprises: causing the UE to consider the PDU session as an always-on PDU session.

In some embodiments, wherein in an instance in which the always-on PDU session indication IE is included in the PDU session modification command message, and the always-on PDU session indication IE is set to a value indicative of "Always-on PDU session not allowed", the method further comprises: causing the UE to not consider the PDU session as an always-on PDU session.

In some embodiments, upon an inter-system change from S1 mode to N1 mode, determining, based on the local policies or configuration in the SMF, whether the requested PDU session need to be an always-on PDU session; and upon a determination that the requested PDU session need to be an always-on PDU session, setting the always-on PDU session indication IE included in the PDU session modification command message to a value indicative of "Always-on PDU session required".

In some embodiments, the method may further comprise, upon an inter-system change from S1 mode to N1 mode, determining, based on the local policies or configuration in the SMF, whether the requested PDU session need to be an always-on PDU session; and upon a determination that the requested PDU session need not to be an always-on PDU session, setting the always-on PDU session indication IE included in the PDU session modification command message to a value indicative of "Always-on PDU session not allowed".

In some embodiments, an apparatus may be provided comprising at least one processor and at least one memory including computer program code, the at least one memory and the computer program code configured to, with the processor, cause the apparatus to at least: receive, from user equipment (UE), a protocol data unit (PDU) session modification request message, the PDU session modification request message configured to indicate a request to modify a PDU session corresponding to a PDN connection established when in S1 mode, after the first inter-system change from S1 mode to N1 mode, the PDU session modification request message comprising an information element (IE) set to a value indicative of a request the PDU session to be an always on protocol data unit (PDU) session; and determine, based on local policies or configurations, whether the requested PDU session shall be an always-on PDU session.

In some embodiments, wherein the at least one memory and the computer program code are further configured to, with the processor, cause the apparatus to: upon a determination that the requested PDU session shall be an always-on PDU session, cause transmission of a PDU session modification command message, the PDU session modification command message comprising an always-on PDU session indication IE, wherein the always-on PDU session indication IE is set to a value indicative of "Always-on PDU session required".

In some embodiments, the at least one memory and the computer program code are further configured to, with the processor, cause the apparatus to: upon a determination that the requested PDU session shall not be an always-on PDU session, cause transmission of a PDU session modification command message, the PDU session modification command message comprising an always-on PDU session indication IE, wherein the always-on PDU session indication IE is set to a value indicative of "Always-on PDU session not allowed".

In some embodiments, the at least one memory and the computer program code are further configured to, with the processor, cause the apparatus to: wherein in an instance in which the always-on PDU session indication IE is included in the PDU session modification command message, and the always-on PDU session indication IE is set to a value indicative of "Always-on PDU session required", cause the UE to consider the PDU session as an always-on PDU session.

In some embodiments, the at least one memory and the computer program code are further configured to, with the processor, cause the apparatus to: in an instance in which the always-on PDU session indication IE is included in the PDU session modification command message, and the always-on PDU session indication IE is set to a value indicative of "Always-on PDU session not allowed", cause the UE to not consider the PDU session as an always-on PDU session.

In some embodiments, wherein the at least one memory and the computer program code are further configured to, with the processor, cause the apparatus to: upon an inter-system change from S1 mode to N1 mode, determine, based on the local policies or configuration in the SMF, whether the requested PDU session need to be an always-on PDU session; and upon a determination that the requested PDU session need to be an always-on PDU session, set the always-on PDU session indication IE included in the PDU session modification command message to a value indicative of "Always-on PDU session required".

In some embodiments, the at least one memory and the computer program code are further configured to, with the processor, cause the apparatus to: upon an inter-system change from S1 mode to N1 mode, determine, based on the local policies or configuration in the SW', whether the requested PDU session need to be an always-on PDU session; and upon a determination that the requested PDU session need not to be an always-on PDU session, set the always-on PDU session indication IE included in the PDU session modification command message to a value indicative of "Always-on PDU session not allowed".

In some embodiments, a computer program product may be provided comprising at least one non-transitory computer-readable storage medium having computer-executable program code instructions stored therein, the computer-executable program code instructions comprising program code instructions for: receiving, from user equipment (UE), a protocol data unit (PDU) session modification request message, the PDU session modification request message configured to indicate a request to modify a PDU session corresponding to a PDN connection established when in S1 mode, after the first inter-system change from S1 mode to N1 mode, the PDU session modification request message comprising an information element (IE) set to a value indicative of a request the PDU session to be an always on protocol data unit (PDU) session; and determining, based on local policies or configurations, whether the requested PDU session shall be an always-on PDU session.

In some embodiments, upon a determination that the requested PDU session shall be an always-on PDU session, the computer-executable program code instructions further comprise program code instructions for: causing transmission of a PDU session modification command message, the PDU session modification command message comprising an always-on PDU session indication IE, wherein the always-on PDU session indication IE is set to a value indicative of "Always-on PDU session required".

In some embodiments, upon a determination that the requested PDU session shall not be an always-on PDU session, wherein the computer-executable program code instructions further comprise program code instructions for: causing transmission of a PDU session modification command message, the PDU session modification command message comprising an always-on PDU session indication IE, wherein the always-on PDU session indication IE is set to a value indicative of "Always-on PDU session not allowed".

In some embodiments, wherein in an instance in which the always-on PDU session indication IE is included in the PDU session modification command message, and the always-on PDU session indication IE is set to a value indicative of "Always-on PDU session required", wherein the computer-executable program code instructions further comprise program code instructions for: causing the UE to consider the PDU session as an always-on PDU session.

In some embodiments, wherein in an instance in which the always-on PDU session indication IE is included in the PDU session modification command message, and the always-on PDU session indication IE is set to a value indicative of "Always-on PDU session not allowed", wherein the computer-executable program code instructions further comprise program code instructions for: causing the UE to not consider the PDU session as an always-on PDU session.

In some embodiments, the computer-executable program code instructions further comprise program code instructions for: upon an inter-system change from S1 mode to N1 mode, determining, based on the local policies or configuration in the SMF, whether the requested PDU session need to be an always-on PDU session; and upon a determination that the requested PDU session need to be an always-on PDU session, setting the always-on PDU session indication IE included in the PDU session modification command message to a value indicative of "Always-on PDU session required".

In some embodiments, the computer-executable program code instructions further comprise program code instructions for: upon an inter-system change from S1 mode to N1 mode, determining, based on the local policies or configuration in the SMF, whether the requested PDU session need to be an always-on PDU session; and upon a determination that the requested PDU session need not to be an always-on PDU session, setting the always-on PDU session indication IE included in the PDU session modification command message to a value indicative of "Always-on PDU session not allowed".

In some embodiments, an apparatus may be provided comprising: means for receiving, from user equipment (UE), a protocol data unit (PDU) session modification request message, the PDU session modification request message configured to indicate a request to modify a PDU session corresponding to a PDN connection established when in S1 mode, after the first inter-system change from S1 mode to N1 mode, the PDU session modification request message comprising an information element (IE) set to a value indicative of a request the PDU session to be an always on protocol data unit (PDU) session; and means for determining, based on local policies or configurations, whether the requested PDU session shall be an always-on PDU session.

In some embodiments, the apparatus may further comprise, upon a determination that the requested PDU session shall be an always-on PDU session, means for causing transmission of a PDU session modification command message, the PDU session modification command message comprising an always-on PDU session indication IE, wherein the always-on PDU session indication IE is set to a value indicative of "Always-on PDU session required".

In some embodiments, the apparatus may further comprise, upon a determination that the requested PDU session shall not be an always-on PDU session, means for causing transmission of a PDU session modification command message, the PDU session modification command message comprising an always-on PDU session indication IE, wherein the always-on PDU session indication IE is set to a value indicative of "Always-on PDU session not allowed".

In some embodiments, in an instance in which the always-on PDU session indication IE is included in the PDU session modification command message, and the always-on PDU session indication IE is set to a value indicative of "Always-on PDU session required", the apparatus further comprises: means for causing the UE to consider the PDU session as an always-on PDU session.

In some embodiments, wherein in an instance in which the always-on PDU session indication IE is included in the PDU session modification command message, and the always-on PDU session indication IE is set to a value indicative of "Always-on PDU session not allowed", the apparatus further comprises: means for causing the UE to not consider the PDU session as an always-on PDU session.

In some embodiments, the apparatus may further comprise, upon an inter-system change from S1 mode to N1 mode, means for determining, based on the local policies or configuration in the SMF, whether the requested PDU session need to be an always-on PDU session; and upon a determination that the requested PDU session need to be an always-on PDU session, setting the always-on PDU session indication IE included in the PDU session modification command message to a value indicative of "Always-on PDU session required".

In some embodiments, the apparatus may further comprise, upon an inter-system change from S1 mode to N1 mode, means for determining, based on the local policies or configuration in the SMF, whether the requested PDU session need to be an always-on PDU session; and upon a determination that the requested PDU session need not to be an always-on PDU session, means for setting the always-on PDU session indication IE included in the PDU session modification command message to a value indicative of "Always-on PDU session not allowed".

In some embodiments, a method may be provided comprising: causing transmission of a protocol data unit (PDU) session modification request message, the PDU session modification request message configured to indicate a request to modify a PDU session corresponding to a PDN connection established when in S1 mode, after the first inter-system change from S1 mode to N1 mode, the PDU session modification request message comprising an information element (IE) set to a value indicative of a request the PDU session to be an always on protocol data unit (PDU) session; upon a determination that the requested PDU session shall be an always-on PDU session, receiving a PDU session modification command message, the PDU session modification command message comprising an always-on PDU session indication IE, wherein the always-on PDU session indication IE is set to a value indicative of "Always-on PDU session required"; and upon a determination that the requested PDU session shall not be an always-on PDU session, receiving a PDU session modification command message, the PDU session modification command message comprising an always-on PDU session indication IE, wherein the always-on PDU session indication IE is set to a value indicative of "Always-on PDU session not allowed".

In some embodiments, the method may further comprise, in an instance in which the always-on PDU session indication IE is included in the PDU session modification command message, and the always-on PDU session indication IE is set to a value indicative of "Always-on PDU session required", considering the PDU session as an always-on PDU session.

In some embodiments, the method may further comprise, in an instance in which the always-on PDU session indication IE is included in the PDU session modification command message, and the always-on PDU session indication IE is set to a value indicative of "Always-on PDU session not allowed", not considering the PDU session as an always-on PDU session.

In some embodiments, an apparatus may be provided comprising at least one processor and at least one memory including computer program code, the at least one memory and the computer program code configured to, with the processor, cause the apparatus to at least: cause transmission of a protocol data unit (PDU) session modification request message, the PDU session modification request message configured to indicate a request to modify a PDU session corresponding to a PDN connection established when in S1 mode, after the first inter-system change from S1 mode to N1 mode, the PDU session modification request message comprising an information element (IE) set to a value indicative of a request the PDU session to be an always on protocol data unit (PDU) session; upon a determination that the requested PDU session shall be an always-on PDU session, receive a PDU session modification command message, the PDU session modification command message comprising an always-on PDU session indication IE, wherein the always-on PDU session indication IE is set to a value indicative of "Always-on PDU session required"; and upon a determination that the requested PDU session shall not be an always-on PDU session, receive a PDU session modification command message, the PDU session modification command message comprising an always-on PDU session indication IE, wherein the always-on PDU session indication IE is set to a value indicative of "Always-on PDU session not allowed".

In some embodiments, the at least one memory and the computer program code are further configured to, with the processor, cause the apparatus to: in an instance in which the always-on PDU session indication IE is included in the PDU session modification command message, and the always-on PDU session indication IE is set to a value indicative of "Always-on PDU session required", consider the PDU session as an always-on PDU session.

In some embodiments, the at least one memory and the computer program code are further configured to, with the processor, cause the apparatus to: in an instance in which the always-on PDU session indication IE is included in the PDU session modification command message, and the always-on PDU session indication IE is set to a value indicative of "Always-on PDU session not allowed", not consider the PDU session as an always-on PDU session.

In some embodiments, a computer program product may be provided comprising at least one non-transitory computer-readable storage medium having computer-executable program code instructions stored therein, the computer-executable program code instructions comprising program code instructions for: causing transmission of a protocol data unit (PDU) session modification request message, the PDU session modification request message configured to indicate a request to modify a PDU session corresponding to a PDN connection established when in S1 mode, after the first inter-system change from S1 mode to N1 mode, the PDU session modification request message comprising an information element (IE) set to a value indicative of a request the PDU session to be an always on protocol data unit (PDU) session; upon a determination that the requested PDU session shall be an always-on PDU session, receiving a PDU session modification command message, the PDU session modification command message comprising an always-on PDU session indication IE, wherein the always-on PDU session indication IE is set to a value indicative of "Always-on PDU session required"; and upon a determination that the requested PDU session shall not be an always-on PDU session, receiving a PDU session modification command message, the PDU session modification command message comprising an always-on PDU session indication IE, wherein the always-on PDU session indication IE is set to a value indicative of "Always-on PDU session not allowed".

In some embodiments, the computer-executable program code instructions further comprise program code instructions for: in an instance in which the always-on PDU session indication IE is included in the PDU session modification command message, and the always-on PDU session indication IE is set to a value indicative of "Always-on PDU session required", considering the PDU session as an always-on PDU session.

In some embodiments, the computer-executable program code instructions further comprise program code instructions for: in an instance in which the always-on PDU session indication IE is included in the PDU session modification command message, and the always-on PDU session indication IE is set to a value indicative of "Always-on PDU session not allowed", not considering the PDU session as an always-on PDU session.

In some embodiments, an apparatus may be provided comprising: means for causing transmission of a protocol data unit (PDU) session modification request message, the PDU session modification request message configured to indicate a request to modify a PDU session corresponding to a PDN connection established when in S1 mode, after the first inter-system change from S1 mode to N1 mode, the PDU session modification request message comprising an information element (IE) set to a value indicative of a request the PDU session to be an always on protocol data unit (PDU) session; upon a determination that the requested PDU session shall be an always-on PDU session, means for receiving a PDU session modification command message, the PDU session modification command message comprising an always-on PDU session indication IE, wherein the always-on PDU session indication IE is set to a value indicative of "Always-on PDU session required"; and upon a determination that the requested PDU session shall not be an always-on PDU session, means for receiving a PDU session modification command message, the PDU session modification command message comprising an always-on PDU session indication IE, wherein the always-on PDU session indication IE is set to a value indicative of "Always-on PDU session not allowed".

In some embodiments, the apparatus may further comprise, in an instance in which the always-on PDU session indication IE is included in the PDU session modification command message, and the always-on PDU session indication IE is set to a value indicative of "Always-on PDU session required", means for considering the PDU session as an always-on PDU session.

In some embodiments, the apparatus may further comprise, in an instance in which the always-on PDU session indication IE is included in the PDU session modification command message, and the always-on PDU session indication IE is set to a value indicative of "Always-on PDU session not allowed", means for not considering the PDU session as an always-on PDU session.

BRIEF DESCRIPTION OF THE DRAWINGS

Figure 1A:
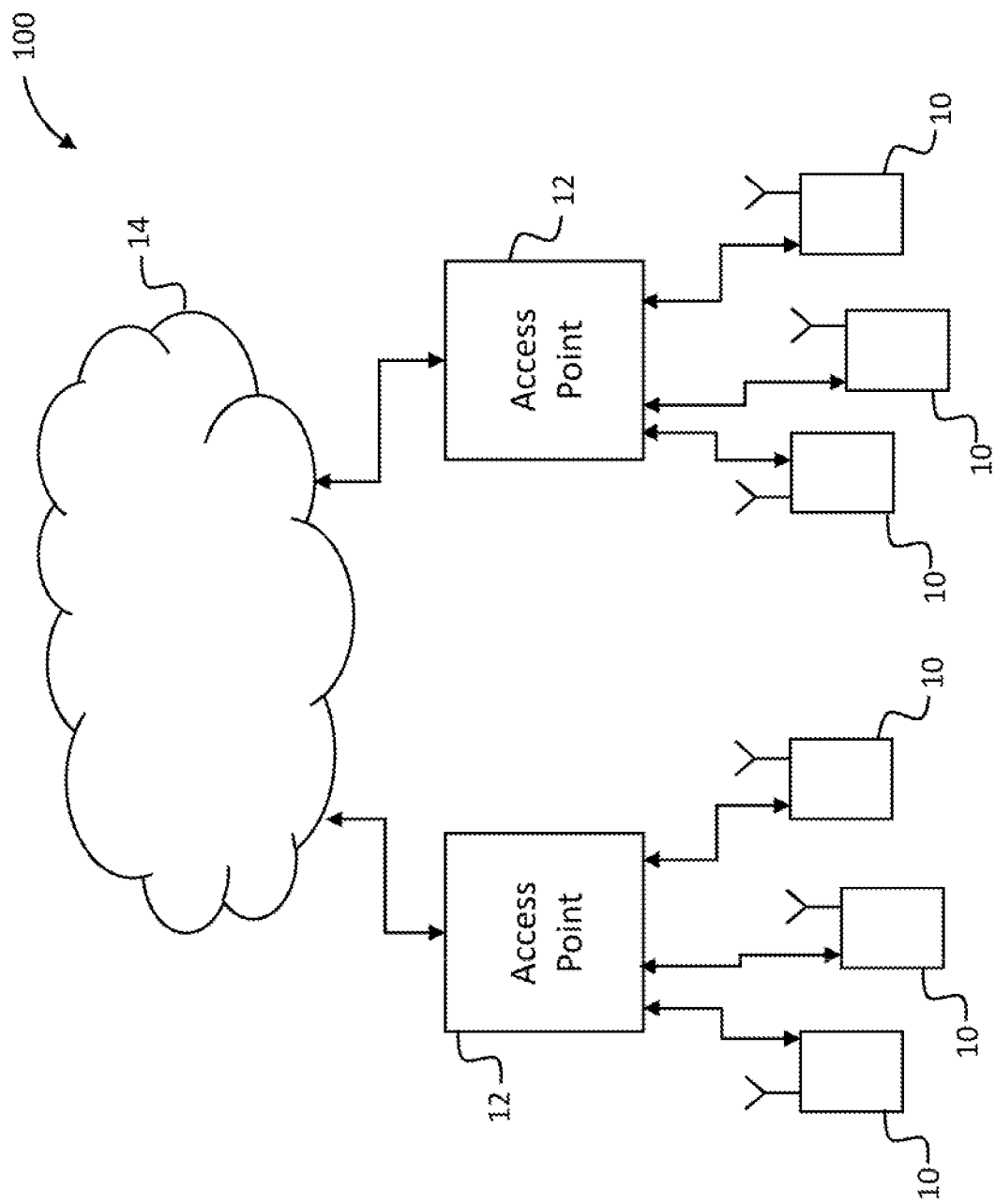
Figure 1B:
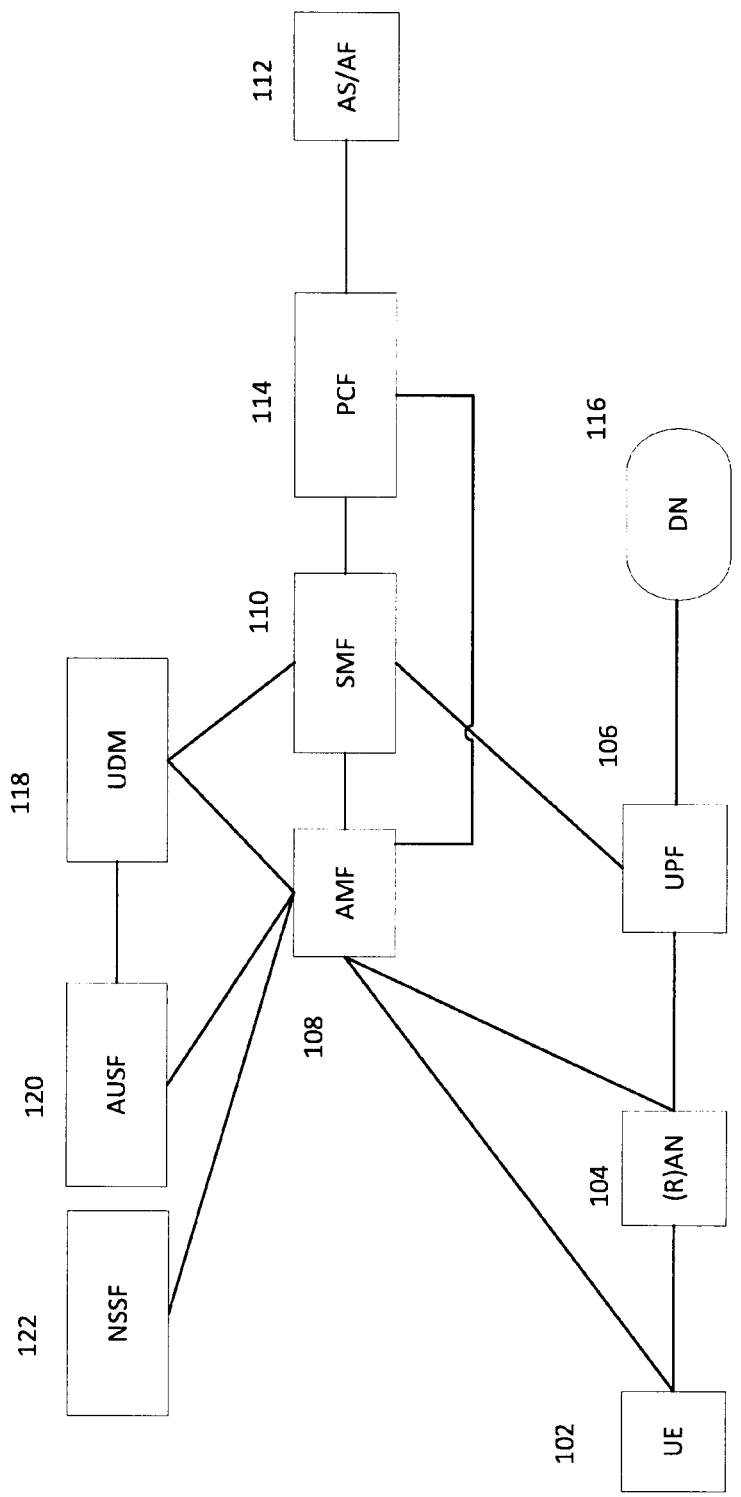
Figure 2:
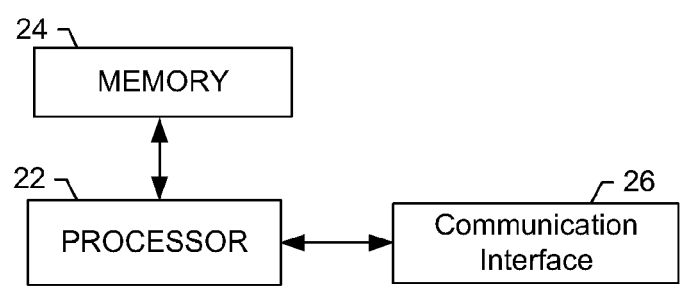
Figure 3:
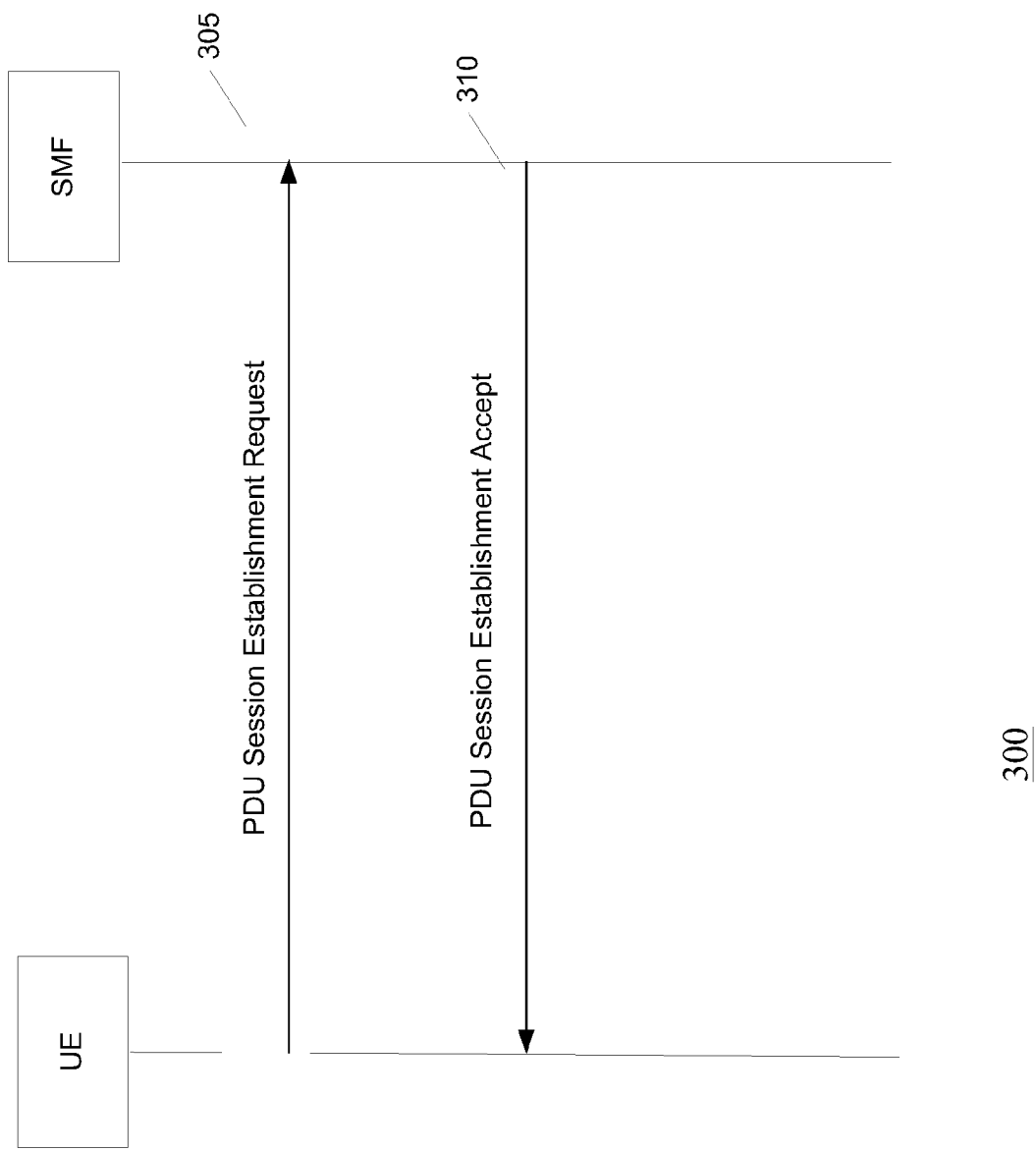
Figure 4:
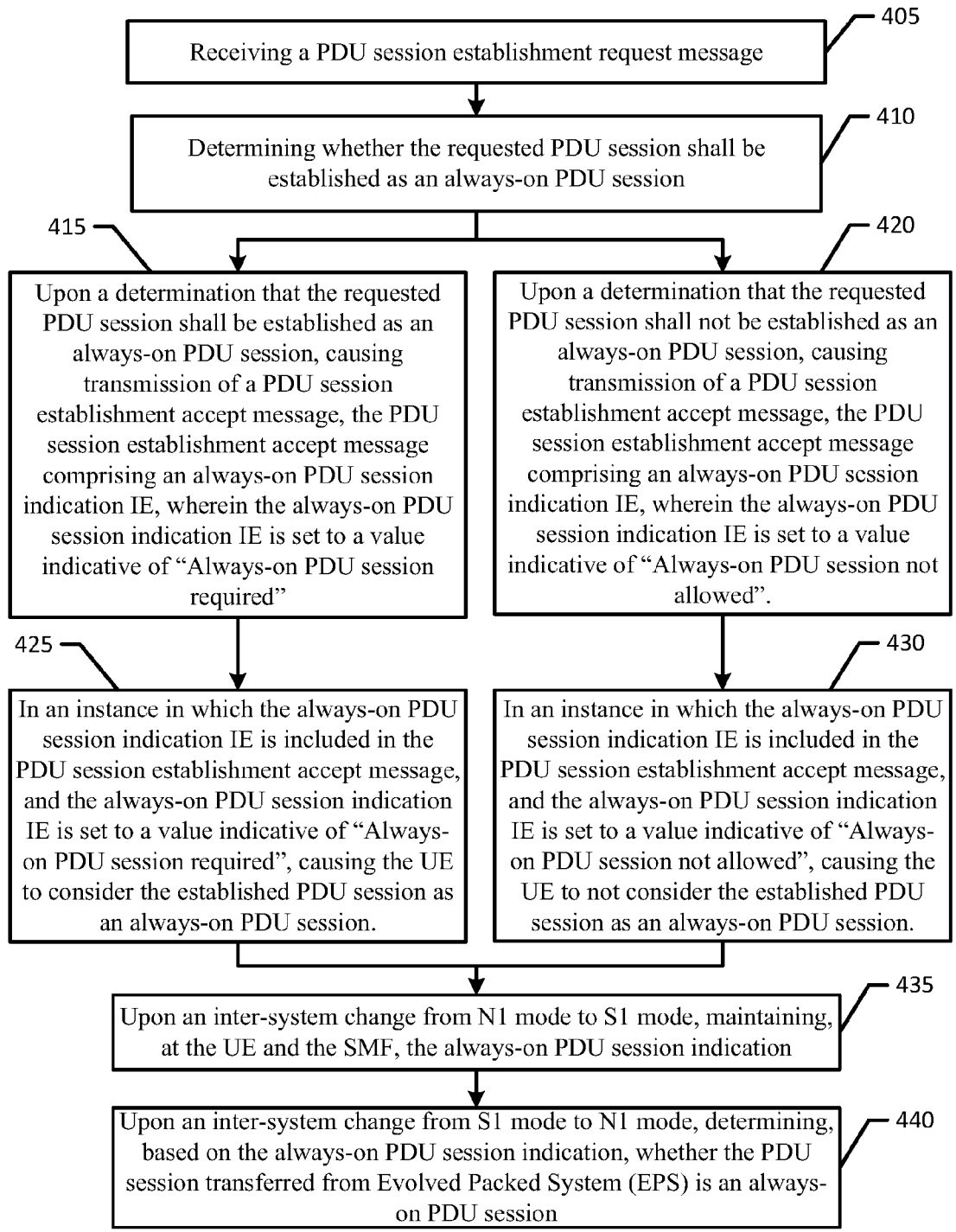
Figure 5:
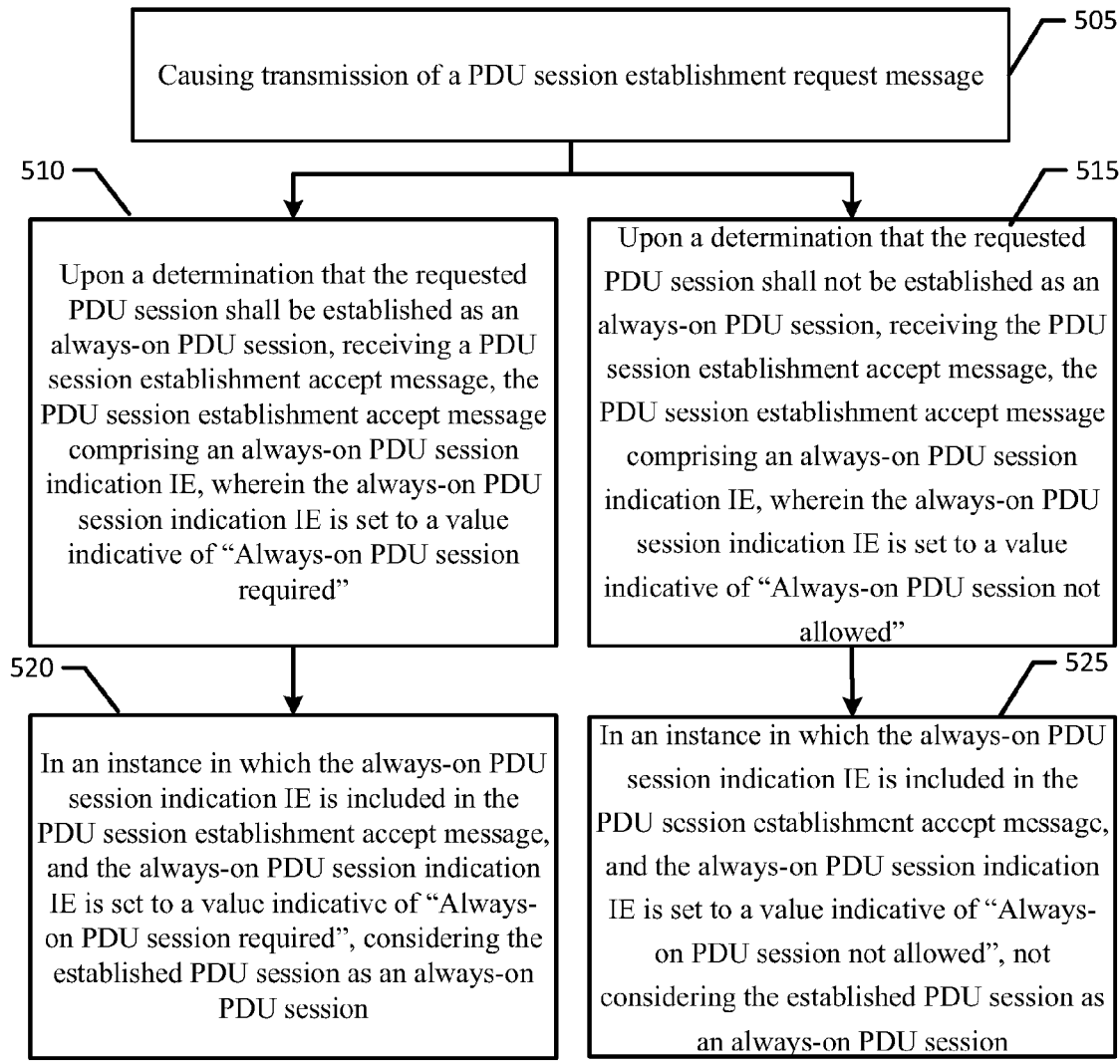
Figure 6:
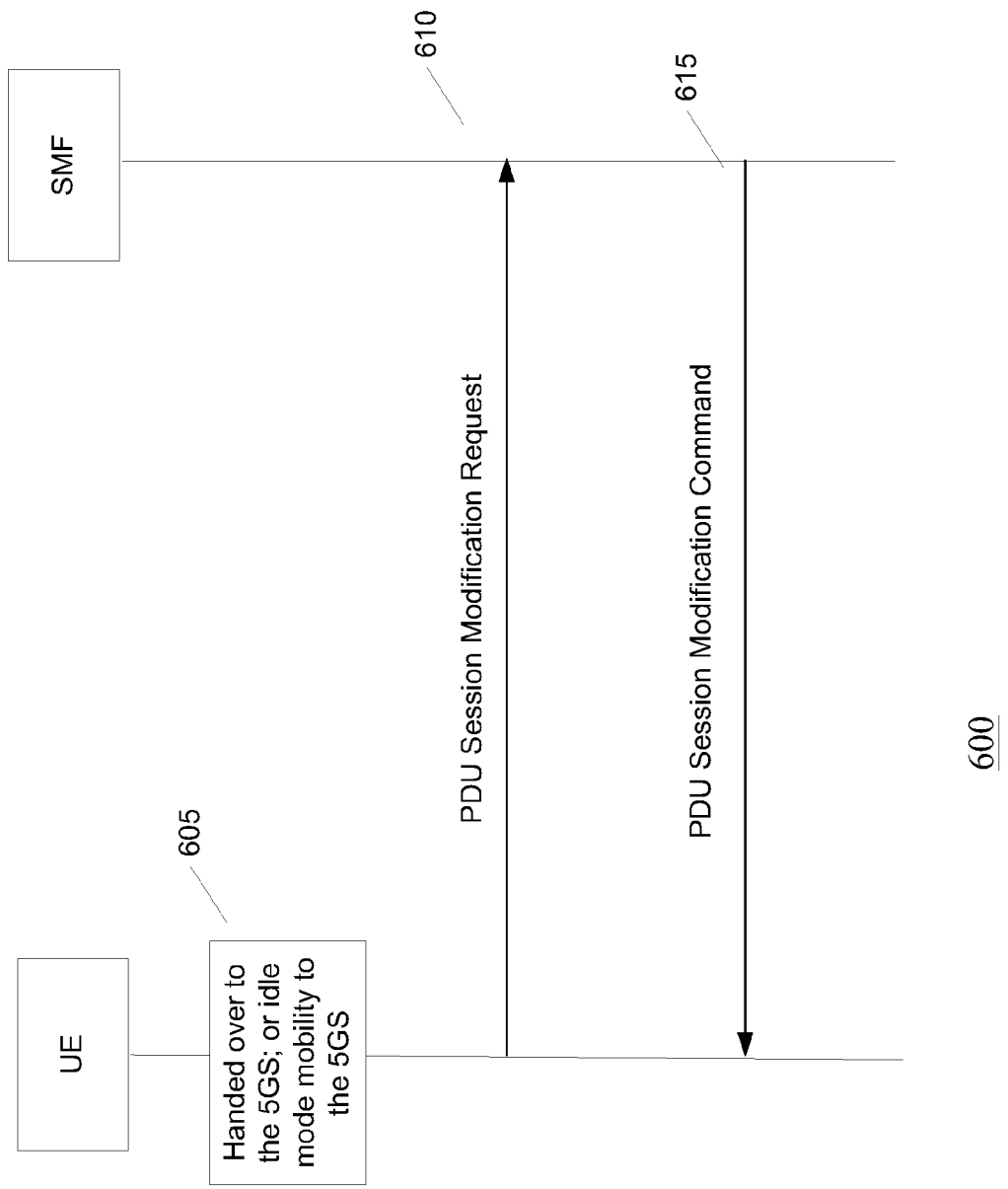
Figure 7:
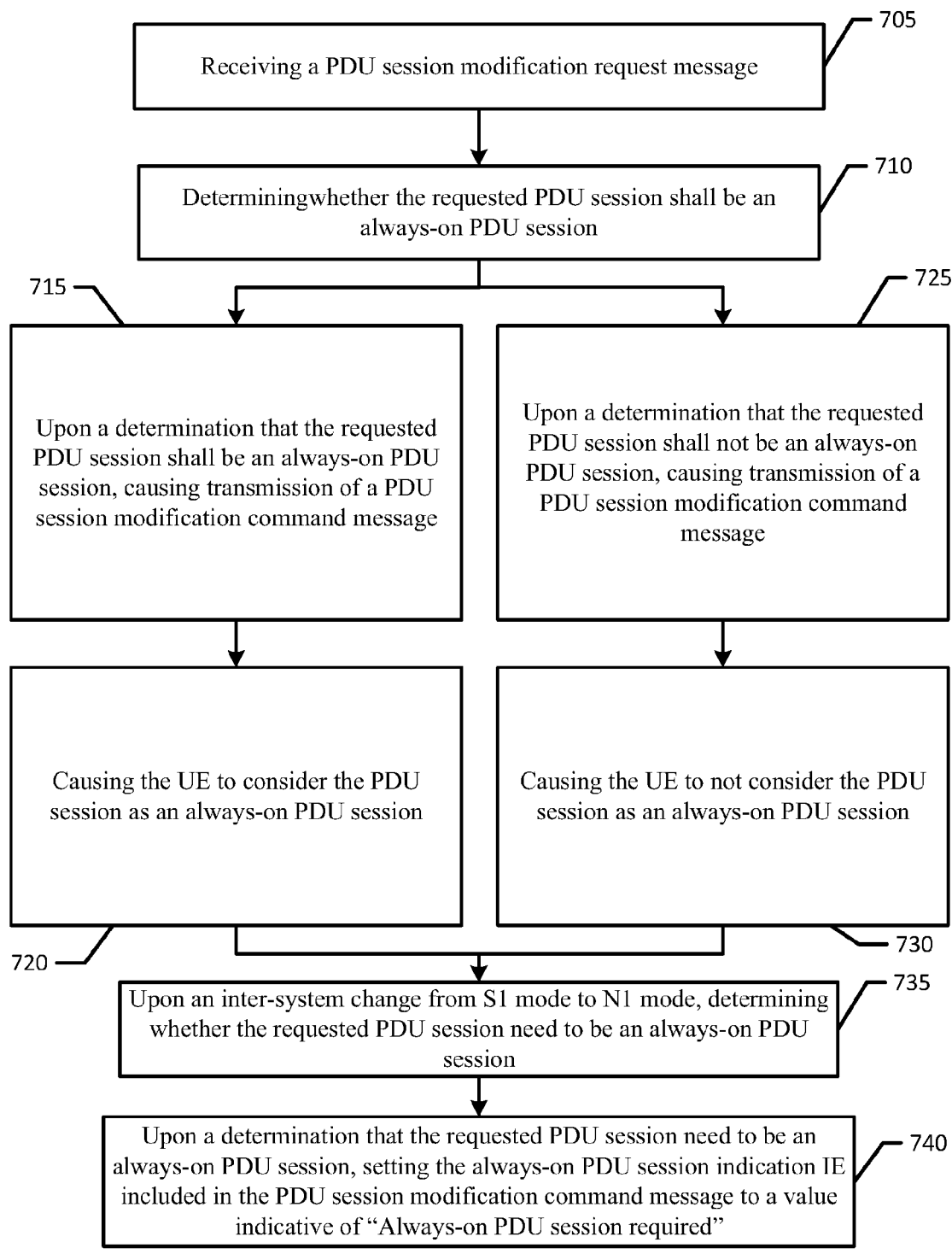
Figure 8:
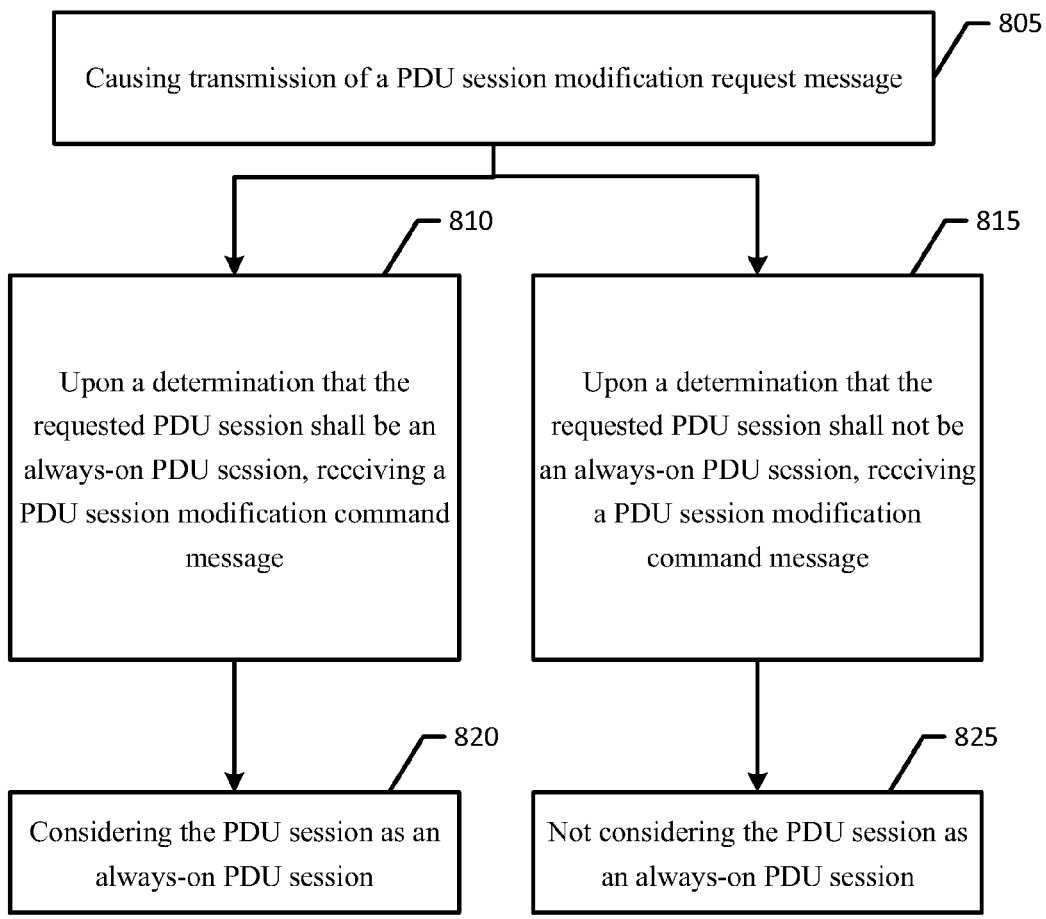

Having thus described certain example embodiments of the present disclosure in general terms, reference will hereinafter be made to the accompanying drawings, which are not necessarily drawn to scale, and wherein:

FIGS. 1A and 1B show block diagrams of systems that may be specifically configured, in accordance with an example embodiment of the present disclosure;

FIG. 2 is a block diagram of an apparatus that may be specifically configured in accordance with an example embodiment of the present disclosure;

FIG. 3 shows a data flow diagram illustrating an exemplary embodiment of the present invention;

FIGS. 4 and 5 show flowcharts depicting operations performed, such as by the apparatus of FIG. 2, in accordance with an example embodiment of the present disclosure;

FIG. 6 shows a data flow diagram illustrating an exemplary embodiment of the present invention; and FIGS. 7 and 8 show flowcharts depicting operations performed, such as by the apparatus of FIG. 2, in accordance with an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, field programmable gate array, and/or other computing device.

As defined herein, a "computer-readable storage medium," which refers to a physical storage medium (e.g., volatile or non-volatile memory device), may be differentiated from a "computer-readable transmission medium," which refers to an electromagnetic signal.

A method, apparatus and computer program product may be provided in order to provide an always-on as an attribute of a PDU session. A method, apparatus and computer program product may also be provided for providing interworking aspects with respect to an always-on PDU session. A method, apparatus and computer program product may also be provided for providing functionality enabling the determination of whether a PDU session can be an always-on PDU session or not to be decided by the network.

Referring now to FIG. 1, which illustrates an example system that supports communications between a plurality of stations 10 and one or more radio base stations/access points 12 (for example, a high density system scenario where a plurality of radio base stations/access points may be deployed to a geographical area and may be operating on the same frequency channel), each radio base station/access point may communicate with one or more stations and, in one embodiment, may communicate with a large number of stations. The radio base stations/access points may, in turn, communicate with a network 14. While the radio base stations/access points may communicate via 5G, an Long Term Evolution (LTE) or LTE-Advanced (LTE-A) network, other networks may support communications between the access points including those configured in accordance with wideband code division multiple access (W-CDMA), CDMA2000, global system for mobile communications (GSM), general packet radio service (GPRS), the IEEE 802.11 standard including, for example, the IEEE 802.11ah or 802.11ac standard or other newer amendments of the standard, wireless local access network (WLAN), Worldwide Interoperability for Microwave Access (WiMAX) protocols, universal mobile telecommunications systems (UMTS) terrestrial radio access network (UTRAN) and/or the like, as well as other standards, for example, with respect to multi-domain networks, that may include, industrial wireless communication networks such as WirelessHART, Bluetooth, ZigBee etc. and/or the like.

The radio base stations/access points 12 and the stations 10 may communicate via wireline communications, but most commonly communicate via wireless communications. For example, the radio base stations/access points and the stations may communicate in a sub 1 GHz band as defined by IEEE 802.11ah standard or in a 5 GHz band, which may be defined by, for example, IEEE 802.11ac standard. The radio base station/access point may be embodied by any of a variety of network entities, such as an access point, a base station, a Node B, an evolved Node B (eNB), a radio network controller (RNC), a mobile device/a station (for example, mobile telephones, smart phones, portable digital assistants (PDAs), pagers, laptop computers, tablet computers or any of numerous other hand held or portable communication devices, computation devices, content generation devices, content consumption devices, or combinations thereof), or the like. The stations may also be embodied by a variety of devices, such as sensors, meters or the like. The sensors and meters may be deployed in a variety of different applications including in utility applications to serve as a gas meter, a water meter, a power meter or the like, in environmental and/or agricultural monitoring applications, in industrial process automation applications, vehicular or transportation automation application, in healthcare and fitness applications, in building automation and control applications and/or in temperature sensing applications. Stations that are embodied by sensors or meters may be utilized in some embodiments to backhaul sensor and meter data. Alternatively, the stations may be embodied by mobile terminals or user equipment(s) (UE), such as mobile communication devices, for example, mobile telephones, smart phones, portable digital assistants (PDAs), pagers, laptop computers, tablet computers or any of numerous other hand held or portable communication devices, computation devices, content generation devices, content consumption devices, or combinations thereof. In an embodiment in which the station is embodied by a mobile terminal, the communication between an access point and the station may serve to extend the range of Wi-Fi or another wireless local area network (WLAN), such as by extending the range of a hotspot, and to offload traffic that otherwise would be carried by a cellular or other network.

The radio base station/access point 12 and/or the station 10 may be embodied as or otherwise include an apparatus 20 that is specifically configured to perform the functions of the respective device, as generically represented by the block diagram of FIG. 2. While the apparatus may be employed, for example, by a radio base station/access point or a station, it should be noted that the components, devices or elements described below may not be mandatory and thus some may be omitted in certain embodiments. Additionally, some embodiments may include further or different components, devices or elements beyond those shown and described herein.

FIG. 1B shows the principles of the 5G architecture in the current draft 3GPP specifications. In particular, FIG. 1B is a networked system 100 in accordance with an example embodiment of the present disclosure. FIG. 1B specifically illustrates User Equipment (UE) 102, which may be in communication with a Radio Access Network (RAN) 104 and Access and Mobility Management Function (AMF) 108 and User Plane Function (UPF) 106. The AMF 108 may, in turn, be in communication with core network services including Session Management Function (SMF) 110 and Policy Control Function (PCF) 114. The core network services may also be in communication with an Application Server/Application Function (AS/AF) 112. Other networked services also include Network Slice Selection Function (NSSF) 122, Authentication Server Function (AUSF) 120, User Data Management (UDM) 118, and Data Network (DN) 116.

Regardless of the type of device that embodies the radio base station/access point 12 and/or the station 10, UE 102, any of the network devices including, but not limited to SMF 110, or any of the other devices shown, the radio base station/access point 12 and/or the station 10, UE 102 or any of the other devices shown may include or be associated with an apparatus 20 as shown in FIG. 2. In this regard, the apparatus may include or otherwise be in communication with a processor 22, a memory device 24, and a communication interface 26. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

In some embodiments, the processor 22 (and/or co-processors or any other processing circuitry assisting or otherwise associated with the processor) may be in communication with the memory device 24 via a bus for passing information among components of the apparatus. The memory device may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus 20 to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 20 may be embodied by a computing device 10 configured to employ an example embodiment of the present invention. However, in some embodiments, the apparatus may be embodied as a chip or chip set. In other words, the apparatus may comprise one or more physical packages (for example, chips) including materials, components and/or wires on a structural assembly (for example, a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 22 may be configured to execute instructions stored in the memory device 24 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

Meanwhile, the communication interface 26 may be any means such as a device or circuitry embodied in either hardware or a combination of hardware and software that is configured to receive and/or transmit data between the computing device 10 and a server 12. In this regard, the communication interface 26 may include, for example, an antenna (or multiple antennas) and supporting hardware and/or software for enabling communications wirelessly. Additionally or alternatively, the communication interface may include the circuitry for interacting with the antenna(s) to cause transmission of signals via the antenna(s) or to handle receipt of signals received via the antenna(s). For example, the communications interface may be configured to communicate wirelessly with the head mounted displays 10, such as via Wi-Fi, Bluetooth or other wireless communications techniques. In some instances, the communication interface may alternatively or also support wired communication. As such, for example, the communication interface may include a communication modem and/or other hardware/software for supporting communication via cable, digital subscriber line (DSL), universal serial bus (USB) or other mechanisms. For example, the communication interface may be configured to communicate via wired communication with other components of the computing device.

FIG. 3 shows a data flow diagram illustrating an exemplary embodiment of the present invention. In particular, FIG. 3 shows the initiation of a UE-initiated PDU session establishment procedure and subsequently, a SMF response. For example, in some embodiments, a UE may initiate a UE-requested PDU session establishment procedure. If the UE requests to establish a new always-on PDU session, the UE shall include the Always-on PDU session requested information element (IE) and set the value of the IE to "Always-on PDU session requested" or the like. As such, as shown at 305, UE 102 may provide, to SMF 110, a PDU session establishment request message. It follows that also at 305, SMF 110, receives from UE 102, the PDU session establishment request message. The PDU session establishment request message may comprise an always-on PDU session requested IE, wherein the always-on PDU session requested IE is set to a value of "Always-on PDU session requested" or the like.

Subsequent to reception of the always-on PDU session requested IE in the PDU session establishment request message being set to a value of "Always-on PDU session requested" or the like, a determination may be made, for example, based on local policies or configurations in the SMF. That is, as shown in step 310 of FIG. 3, subsequent to reception of a PDU session established request message from the UE, the SMF may provide a PDU session establishment accept message to the UE. In some embodiments, for example, if the SMF determines that the requested PDU session needs to be established as an always-on PDU session, the SMF shall include the Always-on PDU session indication IE in the PDU session established accept message and shall set the value to "Always-on PDU session required." In some embodiments, for example, if the SMF determines that the requested PDU session shall not be established as an always-on PDU session and, if the UE included the Always-on PDU session requested IE, the SMF shall include the Always-on PDU session indication IE in the PDU session establishment accept message and shall set the value to "Always-on PDU session not allowed." In some embodiments, for example, if the SMF determines that the requested PDU session shall not be established as an always-on PDU session and, if the UE did not include the Always-on PDU session requested IE, the SMF shall not include the Always-on PDU session indication IE in the PDU session establishment accept message.

Thereafter, if the always-on PDU session indication IE is included in the PDU session establishment accept message and the value is set to "Always-on PDU session required", the UE shall consider the established PDU session as an always-on PDU session. However, if the always-on PDU session indication IE is included in the PDU session establishment accept message, but the value is set to "Always-on PDU session not allowed", the UE shall not consider the established PDU session as an always-on PDU session. The UE shall not consider the established PDU session as an always-on PDU session if the UE does not receive the Always-on PDU session indication IE in the PDU session establishment accept message.

With regard to an inter-system change from N1 mode to S1 mode, after inter-system change from N1 mode to S1 mode, the UE and the SMF shall maintain the always-on PDU session indication. When the UE moves back to the 5GS (i.e., inter-system change from S1 mode to N1 mode), the UE and the SMF may use the always-on PDU session indication to determine whether the PDU session transferred from EPS is an always-on PDU session.

With regard to an inter-system change from S1 mode to N1 mode, upon inter-system change from S1 mode to N1 mode in 5GMM-IDLE mode, the UE shall set the always-on PDU session indication to the always-on PDU session indication maintained in the UE, if any.

FIGS. 5 and 6 show operations performed by, for example, an apparatus embodied by SMF and UE, respectively, in order to utilize a PDU session establishment procedure and in particular, to provide and/or utilize an always-on as an attribute of a PDU session and to provide interworking aspects with respect to an always-on PDU session. That is, in another exemplary embodiment, a method, apparatus and/or computer program product may be provided for providing a procedure for establishing a PDU session, and in particular, for utilizing an always-on as an attribute of a PDU session to determine whether to provide an always-on PDU session, and upon a determination to provide an always-on PDU session, to provide the always-on PDU session. FIG. 5 is an example flowchart illustrating a method of operating an example apparatus, for example, apparatus 20, embodied by, for example, SMF 110, performed in accordance with an embodiment of the present invention.

In an example embodiment, the apparatus 20 includes means, such as the processor 22 or the like, configured to receive, from UE, a PDU session establishment request message. In some embodiments, the PDU session establishment request message may be configured to indicate a request to establish a new PDU session. In some embodiments, the PDU session establishment request message may comprise an IE set to a value indicative of a request to establish a new-always on PDU session. See block 405 of FIG. 4.

Subsequently, as described above, a determination may then be made. As such, the apparatus 20 includes means, such as the processor 22 or the like, configured to determine, based on local policies or configurations, whether the requested PDU session shall be established as an always-on PDU session. See block 410 of FIG. 4. The determination may result in a determination that the requested PDU session shall be established as an always-on PDU session or, alternatively, that the requested PDU session shall not be established as an always-on PDU session. Accordingly, the apparatus 20 includes means, such as the processor 22 or the like, configured to, upon a determination that the requested PDU session shall be established as an always-on PDU session, cause transmission of a PDU session establishment accept message, the PDU session establishment accept message comprising an always-on PDU session indication IE, wherein the always-on PDU session indication IE is set to a value indicative of "Always-on PDU session required". See block 415 of FIG. 4. The apparatus 20 includes means, such as the processor 22 or the like, configured to, upon a determination that the requested PDU session shall not be established as an always-on PDU session, cause transmission of a PDU session establishment accept message, the PDU session establishment accept message comprising an always-on PDU session indication IE, wherein the always-on PDU session indication IE is set to a value indicative of "Always-on PDU session not allowed". See block 420 of FIG. 4.

As an effect of the always-on PDU session indication IE being set to one of "Always-on PDU session required" or "Always-on PDU session not allowed", the UE is informed as to the status of the newly established PDU session. The apparatus 20 includes means, such as the processor 22 or the like, configured to, an instance in which the always-on PDU session indication IE is included in the PDU session establishment accept message, and the always-on PDU session indication IE is set to a value indicative of "Always-on PDU session required", cause the UE to consider the established PDU session as an always-on PDU session. See block 425 of FIG. 4. The apparatus 20 includes means, such as the processor 22 or the like, configured to, in an instance in which the always-on PDU session indication IE is included in the PDU session establishment accept message, and the always-on PDU session indication IE is set to a value indicative of "Always-on PDU session not allowed", cause the UE to not consider the established PDU session as an always-on PDU session. See block 430 of FIG. 4.

The apparatus 20 includes means, such as the processor 22 or the like, configured to, upon an inter-system change from N1 mode to S1 mode, maintain, at the UE and the SMF, the always-on PDU session indication. See block 435 of FIG. 4. The apparatus 20 includes means, such as the processor 22 or the like, configured to, upon an inter-system change from S1 mode to N1 mode, determine, based on the always-on PDU session indication, whether the PDU session transferred from Evolved Packed System (EPS) is an always-on PDU session. See block 440 of FIG. 4.

FIG. 5 is a flowchart depicting an exemplary embodiment for requesting an always-on PDU session. In particular, UE may initiate a UE-requested PDU session establishment procedure, for example, in an instance in which the UE is configured to establish a new always-on PDU session, the UE shall include the Always-on PDU session requested information element (IE) and set the value of the IE to "Always-on PDU session requested" or the like. The operations performed by the apparatus 20 in order request an always-on PDU session utilizing an always-on attribute IE of a PDU session are depicted in the flowchart of FIG. 5.

The apparatus 20 includes means, such as the processor 22 or the like, configured to cause transmission of a protocol data unit (PDU) session establishment request message. In some embodiments, for instance, in those embodiments in which UE is configured to necessitate an always-on PDU session, the PDU session establishment request message may be configured to indicate a request to establish a new PDU session, such that the PDU session establishment request message comprises an IE set to a value indicative of a request to establish a new-always on PDU session. See block 505 of FIG. 5.

Upon transmission of the PDU session establishment request message, a determination may be made by, for example, SMF. The apparatus 20 includes means, such as the processor 22 or the like, configured to, upon a determination that the requested PDU session shall be established as an always-on PDU session, receive a PDU session establishment accept message, the PDU session establishment accept message comprising an always-on PDU session indication IE, wherein the always-on PDU session indication IE is set to a value indicative of "Always-on PDU session required". See block 510 of FIG. 5.

The apparatus 20 may also include means, such as the processor 22 or the like, configured to, upon a determination, for example, by the SMF, that the requested PDU session shall not be established as an always-on PDU session, receive the PDU session establishment accept message, the PDU session establishment accept message comprising an always-on PDU session indication IE, wherein the always-on PDU session indication IE is set to a value indicative of "Always-on PDU session not allowed". See block 515 of FIG. 5.

The apparatus 20 includes means, such as the processor 22 or the like, configured to, in an instance in which the always-on PDU session indication IE is included in the PDU session establishment accept message, and the always-on PDU session indication IE is set to a value indicative of "Always-on PDU session required", considering the established PDU session as an always-on PDU session. See block 520 of FIG. 5. The apparatus 20 includes means, such as the processor 22 or the like, configured to, in an instance in which the always-on PDU session indication IE is included in the PDU session establishment accept message, and the always-on PDU session indication IE is set to a value indicative of "Always-on PDU session not allowed", not considering the established PDU session as an always-on PDU session. See block 525 of FIG. 5.

FIG. 6 shows a data flow diagram illustrating an exemplary embodiment of the present invention. In particular, FIG. 6 shows a PDU session modification procedure. For example, in some embodiments, for a PDN connection established when in S1 mode (i.e., the UE and the SMF do not have any maintained always-on PDU session indication), and after the first inter-system change from S1 mode to N1 mode (e.g., 605 of FIG. 6), in those instances in which the UE is operating in single-registration mode in the network not supporting interworking without N26 and the UE requests the PDN connection to be an always-on PDU session in the 5GS, the UE shall include the Always-on PDU session requested IE and set the value of the IE to "Always-on PDU session requested." See 610 of FIG. 6.

Subsequently, a determination is made at the SMF regarding whether the requested PDU session will be established as an always-on PDU session or not. Once the determination is made, the SMF may provide, for example, to the UE, a PDU session establishment command message. See 615 of FIG. 6. In particular, for a PDN connection established when in S1 mode, upon the first inter-system change from S1 mode to N1 mode, if the network-requested PDU session modification procedure is triggered by a UE-requested PDU session modification procedure and the SMF determines, based on local policies or configurations in the SMF and the Always-on PDU session requested IE in the PDU session modification request message (if any), that the requested PDU session needs to be an always-on PDU session, the SMF shall include the Always-on PDU session indication IE in the PDU session modification command message and shall set the value to "Always-on PDU session required." Alternatively, for a PDN connection established when in S1 mode, upon the first inter-system change from S1 mode to N1 mode, if the network-requested PDU session modification procedure is triggered by a UE-requested PDU session modification procedure and the SMF determines, based on local policies or configurations in the SMF and the Always-on PDU session requested IE in the PDU session modification request message (if any), that the requested PDU session shall not be an always-on PDU session and where the UE included the Always-on PDU session requested IE, the SMF shall include the Always-on PDU session indication IE in the PDU session modification command message and shall set the value to "Always-on PDU session not allowed".

In those embodiments in which the network-requested PDU session modification procedure is triggered by a UE-requested PDU session modification procedure for a PDN connection established when in S1 mode, upon the first inter-system change from S1 mode to N1 mode, the SMF determines, based on local policies or configurations in the SMF and the Always-on PDU session requested IE in the PDU session modification request message (if any), that the requested PDU session shall not be an always-on PDU session, and the UE did not include the Always-on PDU session requested IE, the SMF shall not include the Always-on PDU session indication IE in the PDU session modification command message.

Thereafter, if the Always-on PDU session indication IE is included in the PDU session modification command message and the value is set to "Always-on PDU session required", the UE shall consider the established PDU session as an always-on PDU session. Whereas, if the Always-on PDU session indication IE is included in the PDU session modification command message and the value is set to "Always-on PDU session not allowed", the UE shall not consider the established PDU session as an always-on PDU session. The UE shall not consider the modified PDU session as an always-on PDU session if the UE does not receive the Always-on PDU session indication IE in the PDU session modification command message.

In some embodiments, for a PDN connection established when in S1 mode, upon the first inter-system change from S1 mode to N1 mode, based on local policies or configurations in the SMF, if the SMF determines that the requested PDU session needs to be an always-on PDU session, the SMF shall include the Always-on PDU session indication IE in the PDU session modification command message and shall set the value to "Always-on PDU session required".

Whereas, for a PDN connection established when in S1 mode, upon the first inter-system change from S1 mode to N1 mode, based on local policies or configurations in the SMF, if the SMF determines that the requested PDU session shall not be an always-on PDU session, the SMF shall include the Always-on PDU session indication IE in the PDU session modification command message and shall set the value to "Always-on PDU session not allowed". Otherwise, the SMF shall not include the Always-on PDU session indication IE in the PDU session modification command message.

At last, if the Always-on PDU session indication IE is included in the PDU session modification command message and the value is set to "Always-on PDU session required", the UE shall consider the PDU session as an always-on PDU session. Whereas in those instances in which the Always-on PDU session indication IE is included in the PDU session modification command message and the value is set to "Always-on PDU session not allowed", the UE shall not consider the PDU session as an always-on PDU session. In this case, the UE may be configured to ignore any the indication from upper layers on always-on PDU session and inform upper layers that the indication on always-on PDU session is ignored.

FIGS. 7 and 8 show operations performed by, for example, an apparatus embodied by SMF and UE, respectively, in order to provide a modification procedure for a PDN connection established when in S1 mode. That is, in another exemplary embodiment, a method, apparatus and/or computer program product may be provided for providing a modification procedure for a PDN connection established when in S1 mode. FIG. 7 is an example flowchart illustrating a method of operating an example apparatus, for example, apparatus 20, embodied by, for example, SMF 110, performed in accordance with an embodiment of the present invention.

In an example embodiment, the apparatus 20 includes means, such as the processor 22 or the like, configured to receive, from UE, a PDU session modification request message, the PDU session modification request message configured to indicate a request to modify a PDU session corresponding to a PDN connection established when in S1 mode, after the first inter-system change from S1 mode to N1 mode, the PDU session modification request message comprising an IE set to a value indicative of a request the PDU session to be an always on PDU session or the PDU session modification request message does not comprise the always-on PDU session requested IE. See block 705 of FIG. 7. In an example embodiment, the apparatus 20 includes means, such as the processor 22 or the like, configured to determine, based on local policies or configurations, and in an instance in which the always-on PDU session requested IE is available, the always-on PDU session requested IE whether the requested PDU session shall be an always-on PDU session. See block 710 of FIG. 7.

In an example embodiment, the apparatus 20 includes means, such as the processor 22 or the like, configured to, upon a determination that the requested PDU session shall be an always-on PDU session, cause transmission of a PDU session modification command message, the PDU session modification command message comprising an always-on PDU session indication IE, wherein the always-on PDU session indication IE is set to a value indicative of "Always-on PDU session required". See block 715 of FIG. 7. The apparatus 20 may also include means, such as the processor 22 or the like, configured to, upon a determination that the requested PDU session shall not be an always-on PDU session, causing transmission of a PDU session modification command message, the PDU session modification command message comprising an always-on PDU session indication IE,", if the UE included the always-on PDU session requested IE in the PDU session establishment request message; or no always-on PDU session indication IE, if the UE did not include the always-on PDU session requested IE in the PDU session establishment request message. See block 720 of FIG. 7.

Subsequently, in an example embodiment, the apparatus 20 includes means, such as the processor 22 or the like, configured to, in an instance in which the always-on PDU session indication IE is not included in the PDU session modification command message, or the always-on PDU session indication IE is included in the PDU session modification command message, and the always-on PDU session indication IE is set to a value indicative of "Always-on PDU session required", cause the UE to consider the PDU session as an always-on PDU session. See block 725 of FIG. 7. The apparatus 20 may then also include means, such as the processor 22 or the like, configured to, in an instance in which the always-on PDU session indication IE is included in the PDU session modification command message, and the always-on PDU session indication IE is set to a value indicative of "Always-on PDU session not allowed", cause the UE to not consider the PDU session as an always-on PDU session. See block 730 of FIG. 7.

In an example embodiment, the apparatus 20 includes means, such as the processor 22 or the like, configured to, upon an inter-system change from S1 mode to N1 mode, determine, based on the local policies or configuration in the SMF, whether the requested PDU session need to be an always-on PDU session; and upon a determination that the requested PDU session need to be an always-on PDU session, set the always-on PDU session indication IE included in the PDU session modification command message to a value indicative of "Always-on PDU session required". See block 735 of FIG. 7.

In an example embodiment, the apparatus 20 includes means, such as the processor 22 or the like, configured to, upon an inter-system change from S1 mode to N1 mode, determine, based on the local policies or configuration in the SMF, whether the requested PDU session need to be an always-on PDU session; and upon a determination that the requested PDU session need not to be an always-on PDU session, set the always-on PDU session indication IE included in the PDU session modification command message to a value indicative of "Always-on PDU session not allowed". See block 740 of FIG. 7.

As described above, FIG. 8 shows operations performed by, for example, an apparatus embodied by UE with respect to a modification procedure for a PDN connection established when in S1 mode. That is, in another exemplary embodiment, a method, apparatus and/or computer program product may be provided for enabling a modification procedure for a PDN connection established when in S1 mode. FIG. 8 is an example flowchart illustrating a method of operating an example apparatus, for example, apparatus 20, embodied by, for example, UE 102 performed in accordance with an embodiment of the present invention.

In an example embodiment, the apparatus 20 includes means, such as the processor 22 or the like, configured to cause transmission of a PDU session modification request message, the PDU session modification request message configured to indicate a request to modify a PDU session corresponding to a PDN connection established when in S1 mode, after the first inter-system change from S1 mode to N1 mode. In some embodiment, the PDU session modification request message may comprise an IE, the value of the IE set to a value indicative of a request the PDU session to be an always on PDU session or the PDU session modification request message does not comprise the always-on PDU session requested IE. See block 805 of FIG. 8.

Subsequently, a determination is made at the SMF regarding whether the requested PDU session will be an always-on PDU session or not. Once the determination is made, the SMF may provide, for example, to the UE, a PDU session modification command message. In an example embodiment, the apparatus 20 includes means, such as the processor 22 or the like, configured to, upon a determination that the requested PDU session shall be an always-on PDU session, receive a PDU session modification command message, the PDU session modification command message comprising an always-on PDU session indication IE, wherein the always-on PDU session indication IE is set to a value indicative of "Always-on PDU session required". See block 810 of FIG. 8.

The apparatus 20 may also include means, such as the processor 22 or the like, configured to, upon a determination that the requested PDU session shall not be an always-on PDU session, receive a PDU session modification command message, the PDU session modification command message comprising an always-on PDU session indication IE, wherein the always-on PDU session indication IE is set to a value indicative of "Always-on PDU session not allowed" if the UE included the always-on PDU session requested IE in the PDU session modification request message, or no always-on PDU session indication IE, if the UE did not include the always-on PDU session requested IE in the PDU session modification request message. See block 815 of FIG. 8.

Thereafter, in an example embodiment, the apparatus 20 includes means, such as the processor 22 or the like, configured to, in an instance in which the always-on PDU session indication IE is included in the PDU session modification command message, and the always-on PDU session indication IE is set to a value indicative of "Always-on PDU session required", consider the PDU session as an always-on PDU session. See block 820 of FIG. 8.

The apparatus 20 may also include means, such as the processor 22 or the like, configured to, in an instance in which the always-on PDU session indication IE is included in the PDU session modification command message, and the always-on PDU session indication IE is set to a value indicative of "Always-on PDU session not allowed", not consider the PDU session as an always-on PDU session. See block 825 of FIG. 8.

As described above, FIGS. 4, 5, 7, and 8 are flowcharts of an apparatus, method, and computer program product according to example embodiments of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above, such as in conjunction with the flowcharts of FIGS. 4, 5, 7, and 8. In other embodiments, the computer program instructions, such as the computer-readable program code portions, need not be stored or otherwise embodied by a non-transitory computer-readable storage medium, but may, instead, be embodied by a transitory medium with the computer program instructions, such as the computer-readable program code portions, still being configured, upon execution, to perform the functions described above.

Accordingly, blocks of the flowcharts support combinations of means for performing the specified functions and combinations of operations for performing the specified functions. It will also be understood that one or more blocks of the flowcharts, and combinations of blocks in the flowcharts, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. An apparatus comprising:
at least one processor; and at least one memory including computer program code, the at least one memory and the computer program code configured to, with the processor, cause the apparatus to at least:
  receive, from user equipment (UE), a protocol data unit (PDU) session modification request message, the PDU session modification request message configured to indicate a request to modify a PDU session corresponding to a packet data network (PDN) connection established when in S1 mode, after the first inter-system change from S1 mode to N1 mode, the PDU session modification request message comprising an information element (IE) set to a value indicative of a request for the PDU session to be an always-on PDU session; and
  based on local policies or configurations, in an instance in which the always-on PDU session requested IE is available, determine whether to modify the requested PDU session to be an always-on PDU session.

2. The apparatus according to claim 1, wherein, in an instance in which an outcome of said determining is determining to modify the requested PDU session to be an always-on PDU session, the at least one memory and the computer program code are configured to, with the processor, cause the apparatus to at least:
  cause transmission of a PDU session modification command message, the PDU session modification command message comprising an always-on PDU session indication IE, wherein the always-on PDU session indication IE is set to a value indicative of "Always-on PDU session required".

3. The apparatus according to claim 1, wherein, in an instance in which an outcome of said determining is determining not to modify the requested PDU session to be an always-on PDU session, the at least one memory and the computer program code are configured to, with the processor, cause the apparatus to at least:
  cause transmission of a PDU session modification command message, the PDU session modification command message comprising:
    an always-on PDU session indication IE, wherein the always-on PDU session indication IE is set to a value indicative of "Always-on PDU session not allowed", if the UE included the always-on PDU session requested IE in the PDU session establishment request message; or
    no always-on PDU session indication IE, if the UE did not include the always-on PDU session requested IE in the PDU session establishment request message.

4. The apparatus according to claim 1, wherein the at least one memory and the computer program code are configured to, with the processor, cause the apparatus to at least:
  upon an inter-system change from S1 mode to N1 mode, determine, based on the local policies or configuration in the SMF, whether the requested PDU session need to be an always-on PDU session; and
  upon a determination that the requested PDU session needs to be an always-on PDU session, set the always-on PDU session indication IE included in the PDU session modification command message to a value indicative of "Always-on PDU session required".

5. The apparatus according to claim 1, wherein the at least one memory and the computer program code are configured to, with the processor, cause the apparatus to at least:
  upon an inter-system change from S1 mode to N1 mode, determine, based on the local policies or configuration in the SMF, whether the requested PDU session needs to be an always-on PDU session; and
  upon determining that the requested PDU session need not to be an always-on PDU session, set the always-on PDU session indication IE included in the PDU session modification command message to a value indicative of "Always-on PDU session not allowed".

6. A method comprising:
  receiving, from user equipment (UE), a protocol data unit (PDU) session modification request message, the PDU session modification request message configured to indicate a request to modify a PDU session corresponding to a packet data network (PDN) connection established when in S1 mode, after the first inter-system change from S1 mode to N1 mode, the PDU session modification request message comprising an information element (IE) set to a value indicative of a request for the PDU session to be an always-on PDU session; and
  determining, based on local policies or configurations and in an instance in which the always-on PDU session requested IE is available, whether to modify the requested PDU session to be an always-on PDU session.

7. The method according to claim 6, wherein, in an instance in which an outcome of said determining is determining to modify the requested PDU session to be an always-on PDU session, the method further comprises:
  causing transmission of a PDU session modification command message, the PDU session modification command message comprising an always-on PDU session indication IE, wherein the always-on PDU session indication IE is set to a value indicative of "Always-on PDU session required".

8. The method according to claim 6, wherein, in an instance in which an outcome of said determining is determining not to modify the requested PDU session to be an always-on PDU session, the method further comprises:
  causing transmission of a PDU session modification command message, the PDU session modification command message comprising:
    an always-on PDU session indication IE, wherein the always-on PDU session indication IE is set to a value indicative of "Always-on PDU session not allowed", if the UE included the always-on PDU session requested IE in the PDU session establishment request message; or
    no always-on PDU session indication IE, if the UE did not include the always-on PDU session requested IE in the PDU session establishment request message.

9. The method according to claim 6, further comprising:
  upon an inter-system change from S1 mode to N1 mode, determining, based on the local policies or configuration in a session management function (SMF), whether the requested PDU session need to be an always-on PDU session; and
  upon a determination that the requested PDU session needs to be an always-on PDU session, setting the always-on PDU session indication IE included in the PDU session modification command message to a value indicative of "Always-on PDU session required".

10. The method according to claim 6, further comprising:
  upon an inter-system change from S1 mode to N1 mode, determining, based on the local policies or configuration in a session management function (SMF), whether the requested PDU session needs to be an always-on PDU session; and upon determining that the requested PDU session need not to be an always-on PDU session, setting the always-on PDU session indication IE included in the PDU session modification command message to a value indicative of "Always-on PDU session not allowed".

11. A non-transitory computer-readable medium storing instructions that, when executed, cause an apparatus to carry out at least:
receiving, from user equipment (UE), a protocol data unit (PDU) session modification request message, the PDU session modification request message configured to indicate a request to modify a PDU session corresponding to a packet data network (PDN) connection established when in S1 mode, after the first inter-system change from S1 mode to N1 mode, the PDU session modification request message comprising an information element (IE) set to a value indicative of a request for the PDU session to be an always-on PDU session; and
determining, based on local policies or configurations and in an instance in which the always-on PDU session requested IE is available, whether to modify the requested PDU session to be an always-on PDU session.

12. The non-transitory computer-readable medium according to claim 11, wherein the instructions, when executed, further cause the apparatus to, in an instance in which an outcome of said determining is determining to modify the requested PDU session to be an always-on PDU session, the instructions that, when executed, carry out at least:
causing transmission of a PDU session modification command message, the PDU session modification command message comprising an always-on PDU session indication IE, wherein the always-on PDU session indication IE is set to a value indicative of "Always-on PDU session required".

13. The non-transitory computer-readable medium according to claim 11, wherein the instructions, when executed, further cause the apparatus to, in an instance in which an outcome of said determining is determining not to modify the requested PDU session to be an always-on PDU session, carry out at least:
causing transmission of a PDU session modification command message, the PDU session modification command message comprising:
an always-on PDU session indication IE, wherein the always-on PDU session indication IE is set to a value indicative of "Always-on PDU session not allowed", if the UE included the always-on PDU session requested IE in the PDU session establishment request message; or
no always-on PDU session indication IE, if the UE did not include the always-on PDU session requested IE in the PDU session establishment request message.

14. The non-transitory computer-readable medium according to claim 11, wherein the instructions, when executed, further cause the apparatus to carry out at least:
upon an inter-system change from S1 mode to N1 mode, determining, based on the local policies or configuration in a session management function (SMF), whether the requested PDU session need to be an always-on PDU session; and
upon a determination that the requested PDU session needs to be an always-on PDU session, setting the always-on PDU session indication IE included in the PDU session modification command message to a value indicative of "Always-on PDU session required".

15. The non-transitory computer-readable medium according to claim 11, wherein the instructions, when executed, further cause the apparatus to carry out at least:
upon an inter-system change from S1 mode to N1 mode, determining, based on the local policies or configuration in a session management function (SMF), whether the requested PDU session needs to be an always-on PDU session; and
upon determining that the requested PDU session need not to be an always-on PDU session, setting the always-on PDU session indication IE included in the PDU session modification command message to a value indicative of "Always-on PDU session not allowed".

16. An apparatus comprising:
at least one processor; and
at least one memory including computer program code, the at least one memory and the computer program code configured to, with the processor, cause the apparatus to at least:
include into a protocol data unit (PDU) session modification request message, an information element (IE) configured to indicate a request for the PDU session to be modified to be an always-on PDU session, the PDU session corresponding to a packet data network (PDN) connection established when in S1 mode, after the first inter-system change from S1 mode to N1 mode;
set the IE in the PDU session modification request message to a value indicative of the request for the PDU session to be modified to be an always-on PDU session;
cause transmission of the PDU session modification request message; and
receive a PDU session modification command message comprising an always-on PDU session indication IE, wherein the always-on PDU session indication IE is set to a value indicative of "Always-on PDU session required" or to a value indicative of "Always-on PDU session not allowed".

17. The apparatus according to claim 16, wherein the at least one memory and the computer program code are further configured to, with the processor, cause the apparatus to:
in an instance in which the always-on PDU session indication IE is included in the PDU session modification command message, and the always-on PDU session indication IE is set to a value indicative of "Always-on PDU session required", consider the PDU session as an always-on PDU session.

18. The apparatus according to claim 16, wherein the at least one memory and the computer program code are further configured to, with the processor, cause the apparatus to:
in an instance in which the always-on PDU session indication IE is included in the PDU session modification command message, and the always-on PDU session indication IE is set to a value indicative of "Always-on PDU session not allowed", not consider the PDU session as an always-on PDU session.

19. A method comprising:
including into a protocol data unit (PDU) session modification request message, an information element (IE) configured to indicate a request for the PDU session to be modified to be an always-on PDU session, the PDU session corresponding to a packet data network (PDN)

connection established when in S1 mode, after the first inter-system change from S1 mode to N1 mode;

setting the IE in the PDU session modification request message to a value indicative of the request for the PDU session to be modified to be an always-on PDU session;

causing transmission of the PDU session modification request message; and receiving a PDU session modification command message comprising an always-on PDU session indication IE, wherein the always-on PDU session indication IE is set to a value indicative of "Always-on PDU session required" or to a value indicative of "Always-on PDU session not allowed".

20. The method according to claim 19, further comprising:
in an instance in which the always-on PDU session indication IE is included in the PDU session modification command message, and the always-on PDU session indication IE is set to a value indicative of "Always-on PDU session required", considering the PDU session as an always-on PDU session.

21. The method according to claim 19, further comprising:
in an instance in which the always-on PDU session indication IE is included in the PDU session modification command message, and the always-on PDU session indication IE is set to a value indicative of "Always-on PDU session not allowed", not considering the PDU session as an always-on PDU session.

22. A non-transitory computer-readable medium storing instructions that, when executed, cause an apparatus to carry out at least:
including into a protocol data unit (PDU) session modification request message, an information element (IE) configured to indicate a request for the PDU session to be modified to be an always-on PDU session, the PDU session corresponding to a packet data network (PDN) connection established when in S1 mode, after the first inter-system change from S1 mode to N1 mode;

setting the IE in the PDU session modification request message to a value indicative of the request for the PDU session to be modified to be an always-on PDU session;

causing transmission of the PDU session modification request message; and receiving a PDU session modification command message comprising an always-on PDU session indication IE, wherein the always-on PDU session indication IE is set to a value indicative of "Always-on PDU session required" or to a value indicative of "Always-on PDU session not allowed".

23. The non-transitory computer-readable medium according to claim 22, wherein the instructions, when executed, further cause the apparatus to carry out at least:
in an instance in which the always-on PDU session indication IE is included in the PDU session modification command message, and the always-on PDU session indication IE is set to a value indicative of "Always-on PDU session required", considering the PDU session as an always-on PDU session.

24. The non-transitory computer-readable medium according to claim 22, wherein the instructions, when executed, further cause the apparatus to carry out at least:
in an instance in which the always-on PDU session indication IE is included in the PDU session modification command message, and the always-on PDU session indication IE is set to a value indicative of "Always-on PDU session not allowed", not considering the PDU session as an always-on PDU session.

* * * * *